United States Patent [19]
Abe et al.

[11] Patent Number: 5,159,990
[45] Date of Patent: Nov. 3, 1992

[54] WHEEL SLIPPAGE CONTROL APPARATUS IN MOTOR VEHICLE

[76] Inventors: Tomoaki Abe, 2-2-6, Momoyama-cho, Oobu-shi, Aichi-ken; Katsuya Maeda, 20-3, Sousaku, Ogakie-cho, Kariya-shi, Aichi-ken; Mitsuo Hara, 15-7, Aza Anderamae, Akechi-cho, Bisai-shi, Aichi-ken; Shigeru Kamio, 1-22-23, Kyoumei, chikusa-ku, Nagoya; Mitsunori Takao, 21-7, Takasu-cho, 2-chome, Kariya-shi, Aichi-ken, all of Japan

[21] Appl. No.: 676,477
[22] Filed: Mar. 27, 1991

Related U.S. Application Data

[63] Continuation of Ser. No. 376,661, Jul. 7, 1989, abandoned.

[30] Foreign Application Priority Data

Jul. 7, 1988 [JP] Japan .................... 63-169965

[51] Int. Cl.$^5$ .................... B60K 31/00; B60K 13/00
[52] U.S. Cl. .................................................. 180/197
[58] Field of Search ................ 180/197, 279, 178, 76

[56] References Cited

U.S. PATENT DOCUMENTS

| | | |
|---|---|---|
| 4,577,718 | 3/1986 | Ueno .................... 180/179 |
| 4,589,511 | 5/1986 | Leiber .................... 180/197 |
| 4,615,410 | 10/1986 | Hosaka .................... 180/197 |
| 4,682,667 | 7/1987 | Hosaka .................... 180/197 |
| 4,705,000 | 11/1987 | Matsumura et al. .......... 123/494 X |
| 4,773,517 | 9/1988 | Watanabe .................... 180/197 X |
| 4,850,446 | 7/1989 | Leiber et al. ............... 180/197 |

FOREIGN PATENT DOCUMENTS

| | | |
|---|---|---|
| 60-99757 | 6/1985 | Japan . |
| 60-128055 | 7/1985 | Japan . |
| 60-151159 | 8/1985 | Japan . |
| 61-9341 | 1/1986 | Japan . |
| 61-46725 | 3/1986 | Japan . |
| 62-121839 | 6/1987 | Japan . |
| 62-261564 | 11/1987 | Japan . |
| 63-32136 | 2/1988 | Japan . |
| 38035 | 2/1988 | Japan .................... 180/197 |

Primary Examiner—Charles A. Marmor
Assistant Examiner—Alan M. Kagen
Attorney, Agent, or Firm—Cushman, Darby & Cushman

[57] ABSTRACT

A slip control apparatus for use in a motor vehicle having an engine for generating a motive power to drive the motor vehicle. The apparatus comprises a first detector for detecting a speed of a driven wheel of the motor vehicle which is driven by the motive power generated from the engine, a second detector for detecting a running speed of the motor vehicle and a third detector for detecting an acceleration of the driven wheel. Also included in the apparatus are a decision unit for determining the occurrence of slipping of the driven wheel on the basis of the detection results of the first and second detectors, a driving force adjusting device for adjusting a driving force of the motor vehicle, and a control unit for controlling the slip of the driven wheel on the basis of information from the first to third detectors. The control unit controls the driving force adjusting device on the basis of the acceleration detected by the third detector when the decision device has determined the occurrence of slipping of the driven wheel.

24 Claims, 25 Drawing Sheets

| GFI | ~0.1G | 0.1G~0.5G | 0.5G~ |
|---|---|---|---|
| KCFC | 5 | 10 | 20 |

| Ne(rpm) | 400 | 800 | 1200 | 2000 | 2800 | 3600 | 4400 | 5200 | 6000 |
|---|---|---|---|---|---|---|---|---|---|
| THMAX(deg.) | 20 | 30 | 30 | 40 | 50 | 60 | 70 | 70 | 80 |

| Ne | 400 | 800 | 1200 | 1600 | 2000 | 2400 | 2800 | 3200 | 3600 | 4000 | 4400 | 4800 | 5200 | 5600 | 6000 |
|---|---|---|---|---|---|---|---|---|---|---|---|---|---|---|---|
| Tsut | 7 | 13 | 15 | 17 | 20 | 22 | 23 | 24 | 25 | 26 | 28 | 33 | 38 | 40 | 43 |
| Tzero | 0 | 0 | 1 | 1.5 | 2 | 3 | 4.5 | 6 | 7 | 8 | 9 | 10.5 | 12 | 13 | 14 |

FIG. 29

|  | Vt > VRLF (VRRF) | Vt ≤ VRLF (VRRF) |
|---|---|---|
| GVRL ≥ 0 (GVRR) | ① | ③ |
| GVRL < 0 (GVRR) | ② | ④ |

FIG. 30

| GRL (GRR) | ~0.3G | 0.3G~0.9G | 0.9G~ |
|---|---|---|---|
| CGBL (CGBR) | 4 | 2 | 1 |

FIG. 31

| GVRL (GVRR) | CTWL (CTWR) |
|---|---|
| ~0.1G | 8 |
| 0.1G~0.2G | 6 |
| 0.2G~0.4G | 4 |
| 0.4G~0.6G | 2 |
| 0.6G~ | 0 |

| GFI | ~ 0.1G | 0.1G ~ 0.5G | 0.5G ~ |
|---|---|---|---|
| KCTS | 10 | 15 | 20 |
| △CTS | 1 | 1.2 | 1.8 |

WHEEL SLIPPAGE CONTROL APPARATUS IN MOTOR VEHICLE

This is a continuation of application Ser. No. 07/376,661 now abandoned, filed on Jul. 7, 1989.

BACKGROUND OF THE INVENTION

The present invention relates generally to slippage control devices for use in motor vehicles, and more particularly to a slippage control apparatus for controlling an excessive slippage of a driven wheel of the motor vehicle developed in response to start and acceleration of the vehicle.

Various types of slippage control apparatus have been known, one approach being disclosed in Japanese Patent provisional Publication No. 62-121839 in which the opening degree of a throttle valve is controlled so as to keep the slip ratio S in a predetermined range, the slip ratio being determined on the basis of a vehicle speed Vb and a driven-wheel speed Vd in accordance with an equation $S=(Vd-Vb)/Vd$. Another known technique involves cutting off supply of fuel into an internal combustion engine in response to occurrence of a slippage of a driven wheel of the vehicle or controlling the output torque of an engine by retarding the ignition timing of the engine.

Generally, the control of the torque of the engine, i.e., the opening degree of the throttle valve, in occurrence of wheel-slippage is based upon the frictional coefficient between the vehicle-running road surface and a tire of the driven wheel which depends on the road surface states and the types of the tire. An appropriate torque supply to the driven wheel can first be achieved under the condition of stability of the feedback control. The vehicle state during no supply of the appropriate torque thereto greatly depends upon the initial value of the operating amount of the throttle valve at the time of a start of the feedback control. That is, when the initial value is small, the drive feeling is insufficient because of too small torque and low acceleration during no supply of the appropriate torque. On the other hand, if the initial value is great, the slippage is not settled and the throttle valve results in hunting so as to frequently change the speed of the drive wheel, thereby similarly causing extreme deterioration of the drive feeling.

Further, similarly in the case of cutting off the fuel supply on the occurrence of the slippage or retarding the ignition timing, there is offered a problem that sufficient control of the slippage may be difficult or the acceleration performance can extremely drops because of fixing the cutting time of the fuel supply and the retardation of the ignition timing.

SUMMARY OF THE INVENTION

It is therefore an object of the present invention to provide a slip control apparatus for use in a motor vehicle which is capable of attaining to both stable running and excellent acceleration performance.

A slip control apparatus according to the present invention controls slipping by adjustment of a driving force of a motor vehicle having an engine for generating a motive power to drive the motor vehicle. That is, the apparatus comprises a control unit for controlling the slip of a driven wheel in accordance with signals from a first detector for detecting a speed of the driven wheel of the motor vehicle which is driven by the motive power generated from the engine, a second detector for detecting a running speed of the motor vehicle and a third detector for detecting an acceleration of the driven wheel. The control unit controls a driving force adjusting device for adjusting a driving force of the motor vehicle on the basis of the acceleration detected by the third detector when slipping of the driven wheel occurs. The decision of the occurrence of slipping is made on the basis of the detection results of the first and second detectors.

The control unit includes a feedback control section for performing feedback control of the driving force adjusting device so that the driven wheel speed detected by the first detector becomes equal to a target driven wheel speed which is determined in accordance with the vehicle speed detected by the second detector and an initial value setting section for determining an initial value in the feedback control means with respect to the driving force adjusting device in accordance with the acceleration detected by the third detector.

Further, the feedback control section includes a target torque setting portion for determining a target value of a torque generated by the engine in accordance with the difference between the target driven wheel speed and the driven wheel speed, a target opening degree setting portion for setting a target throttle opening degree in correspondance with the target torque; and a throttle valve operator for operating the throttle valve of the motor vehicle so as to take the target throttle opening degree.

Here, when the driving force adjusting device is a solenoid-operated fuel injection valve, the control unit determines a time period for stopping supply of a fuel from the fuel injection valve to the engine in accordance with the acceleration detected by the third detection means and controls the fuel injection valve so as to cut off the fuel supply for only the determined time period. Further, when the driving force adjusting device is an ignitor for igniting a mixture of the air and fuel in the engine, the control unit determines a retardation value to retard the ignition timing of the ignitor and controls the ignitor so as to be retarded by a time corresponding to the determined retardation value. In addition, when the driving force adjusting device is a braking device provided with respect to said driven wheel, the control unit controls a braking force of the braking device in accordance with the acceleration.

In the present invention, the driving force adjusting means is controlled in accordance with the acceleration of the driven wheel at the time of occurrence of slipping. This is based upon the fact that the road surface state is an extremely important parameter and the degree of the friction between the road surface and the driven wheel tire correlates with the acceleration of the driven wheel at the time of occurrence of slipping, that is, the increase in the degree of slipping of the driven wheel causes increasing the acceleration of the driven wheel at the time of occurrence of slipping.

BRIEF DESCRIPTION OF THE DRAWINGS

The object and features of the present invention will become more readily apparent from the following detailed description of the preferred embodiments taken in conjunction with the accompanying drawings in which:

FIGS. 29, 30 and 31 shows maps to be used in the FIG. 28 process;

DETAILED DESCRIPTION OF THE INVENTION

Figure 1:
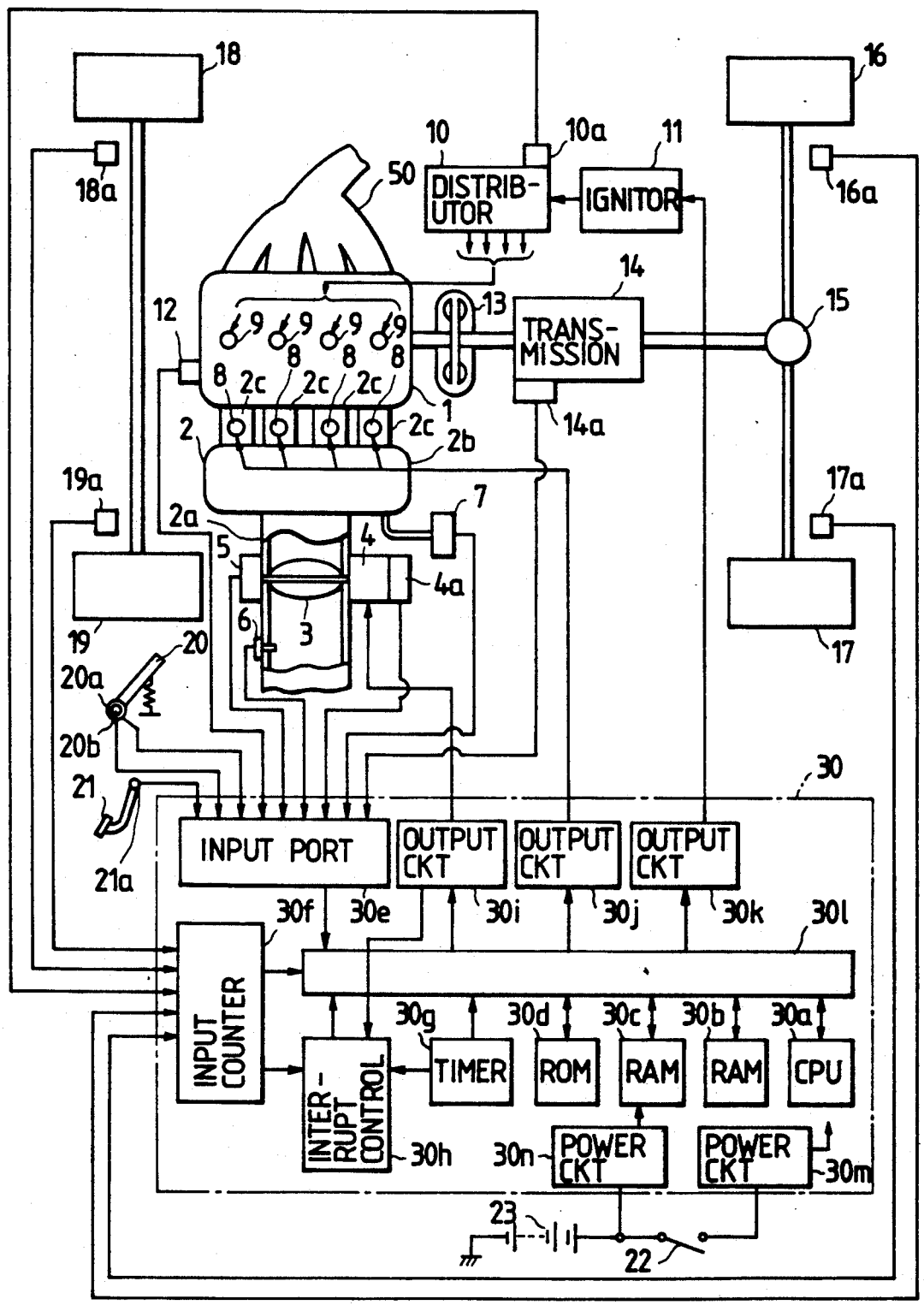
FIG. 1 is a block diagram showing an arrangement of an embodiment of the present invention.

Referring now to FIG. 1, there is schematically illustrated a slip control apparatus according to an embodiment of the present invention which is incorporated into a motor vehicle including a spark-ignition type four-cylinder gasoline-use internal combustion engine 1. The engine 1 is coupled to an air intake pipe 2 and an exhaust pipe 50, the intake pipe 2 comprising an assembly portion 2a connected to an air cleaner (not shown), a surge tank 2b connected to the assembly portion 2a and branch portions 2c provided at the surge tank 2b in correspondance with the respective cylinders of the engine 1. In the assembly portion 2a is provided a throttle valve 3 for controlling the engine output by adjusting the intake air amount into the engine 1. A valve shaft of the throttle valve 3 is coupled to a stepping motor 4 for controlling the opening degree of the throttle valve 3 and further a throttle sensor 5 for sensing the opening degree of the throttle valve 3. Here, on the stepping motor 4 is disposed a full-close sensor 4a for detecting the full-closing position of the motor 4. Further, at an upstream position of the throttle valve 3 of the assembly portion 2a is provided an intake air temperature sensor 6. In the surge tank 2b is provided an intake pipe pressure sensor 7 for detecting the pressure in the intake pipe 2, and to the branch portions 2c are attached solenoid-operated fuel injection valves 8. In addition, the engine 1 is equipped with ignition plugs 9 for igniting an air-fuel mixture to be introduced into the respective cylinders. The ignition plug 9 is coupled through a high-voltage cord to a distributor 10 which is in turn connected electrically to an igniter 11 and on which provided is a rotation sensor 10a for outputting a signal synchronous with the rotation of the engine 1. Still further, the engine is provided with a water temperature sensor 12 for detecting the temperature of cooling water for the engine 1.

The engine output is transferred through a torque converter 13, a transmission 14, a differential gear 15 and so on to drive wheels, i.e., a rear-right wheel 16 and a rear-left wheel 17. On the transmission 14 is provided a gear position sensor 14a for outputting a gear position signal indicative of a gear position of the transmission 14, and for the driven wheel 16, 17 and non-driven wheel, i.e., front-right wheel and front-left wheel, 18, 19 are provided wheel speed sensors 16a, 17a, 18a and 19a for detecting the speeds of the respective wheels 16 to 19. Also included in the apparatus are an acceleration-pedal operation sensor 20a for detecting the amount of operation of an acceleration pedal 20 of the motor vehicle to output a signal indicative of the detected operation amount thereof, an acceleration-pedal full-closing operation sensor 20b for detecting the fact that the acceleration pedal 20 enters into the full-closing state due to release of the acceleration pedal to generate a signal indicative of the full-closingstate, and a brake sensor 21a which turns ON in response to operation or depression of a braking pedal 21 of the motor vehicle and generates a signal indicative of the braking-pedal operation. The output signals of the above-mentioned sensors are supplied to an electronic control unit (ECU) 30 which in turn controls the stepping motor 4, fuel injection valve 8, ignitor 11 and others on the basis of the output signals emerging from the sensors.

The ECU 30 comprises a well known microcomputer including a central processing unit 30a for processing data from the sensors in accordance with a control program so as to supply control signals to the stepping motor 4, fuel injection valve 8, igniter 11 and others. Signals to and from the CPU 30a are carried along a common bus 30e to which are coupled the CPU-associated units. The CPU-associated units are a first random access memory (RAM) 30b for temporarily storing data necessary for the calculation in the CPU 30a, a second random access memory (RAM) 30c for storing data which are successively updated during operation of the engine 1 and which are needed even after turning-off of a key switch 22 of the motor vehicle, and a read-only memory (ROM) 30d for prestoring the control programs, constants and so on necessary for calculation in the CPU 30a. Further included in the CPU-associated units are an input port 30e and an input counter 30f which are provided to receive signals from the sensors, a timer 30g for measurement of time, an interruption control section 30h for causing the CPU 30a to enter into an interruption state in accordance with the data emerging from the input counter 30f and the timer 30g, output circuits 30i, 30j and 30k for outputting signals to drive the stepping motor 4, fuel injection valve 8 and ignitor 11, a first power circuit 30m which is coupled through the key switch 22 to a battery 23 of the motor vehicle so as to supply power to the units other than the RAM 30c, and a second power circuit 30n which is directly coupled to the battery 23 so as to supply power to the RAM 30c.

Figure 2:
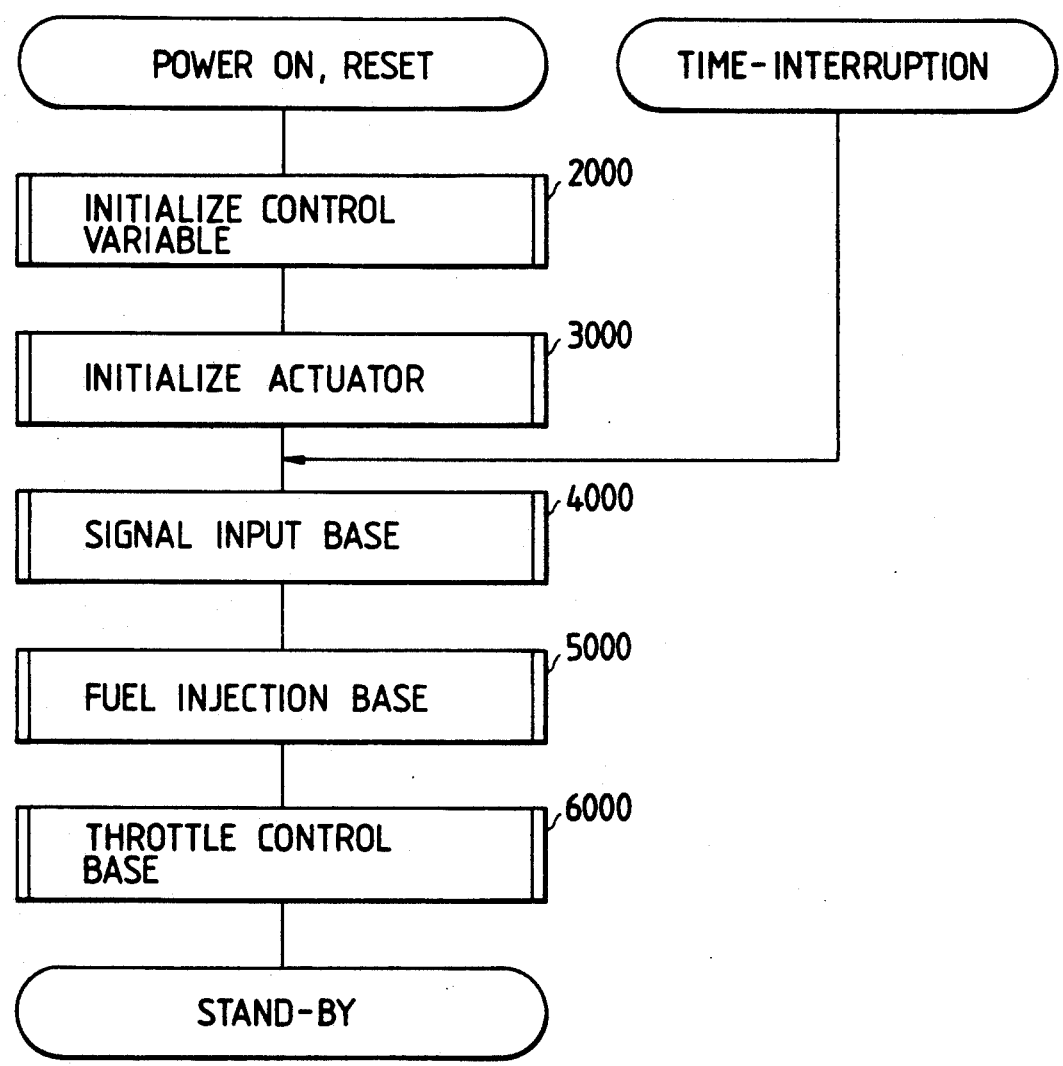
FIG. 2 is a flow chart to be executed in an electronic control unit (ECU) in FIG. 1.

FIG. 2 is a flow chart showing a program executed in the electronic control unit (ECU) 30. The control starts with a step 2000 for initializing control variables in response to the power-on, followed by a step 3000 which initializes the operating positions of the actuator and further performs a so-called primary check for checking the operating state thereof. The control advances to a step 4000 for inputting signals, determining the running state of the motor vehicle and producing data in accordance with the running-state determination. Subsequently, a step 5000 is executed to calculate the fuel injection amount to the engine 1 for a fuel injection process which will be described hereinafter and a step 6000 is then executed to perform a throttle control base process to calculate a target throttle opening degree. . After execution of the step 6000, control enters into the time-interruptible state. The time-interruption takes place in response to the signal from the timer 30g set in the step 2000, which signal being generated at an interval of 10 ms so as to execute the steps 4000 to 6000.

Figure 3:
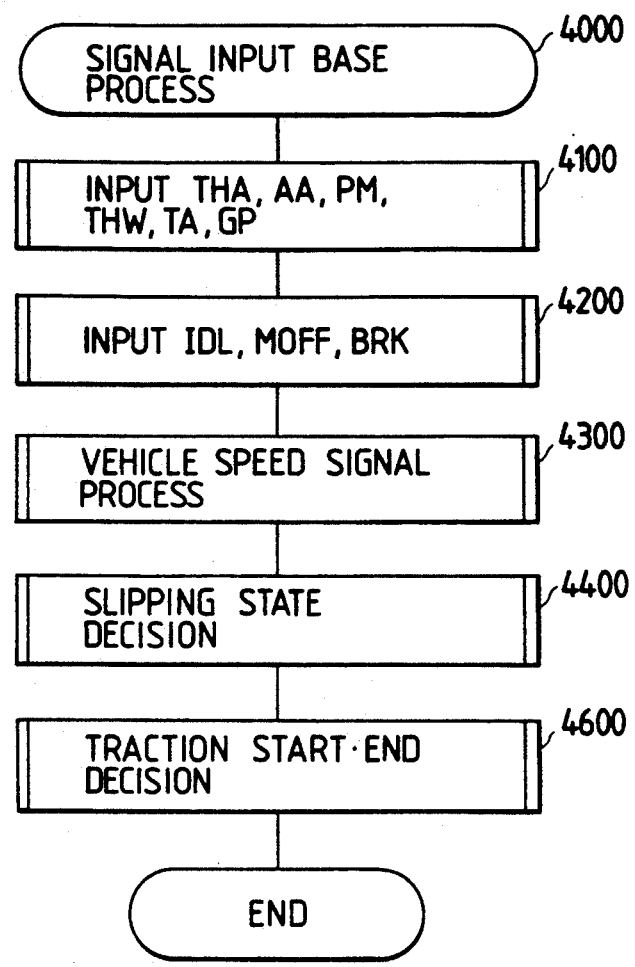
FIG. 3 is a flow chart showing the contents of the step 4000 of the FIG. 2 flow chart.
Figure 4:
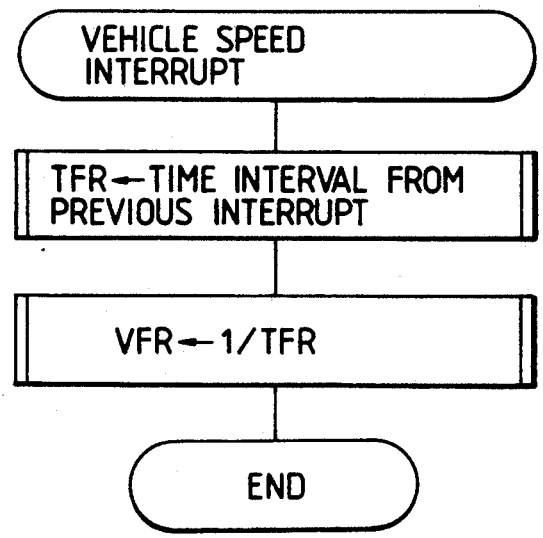
FIG. 4 is a flow chart to be executed in the ECU in response to vehicle speed interupt.
Figure 5:
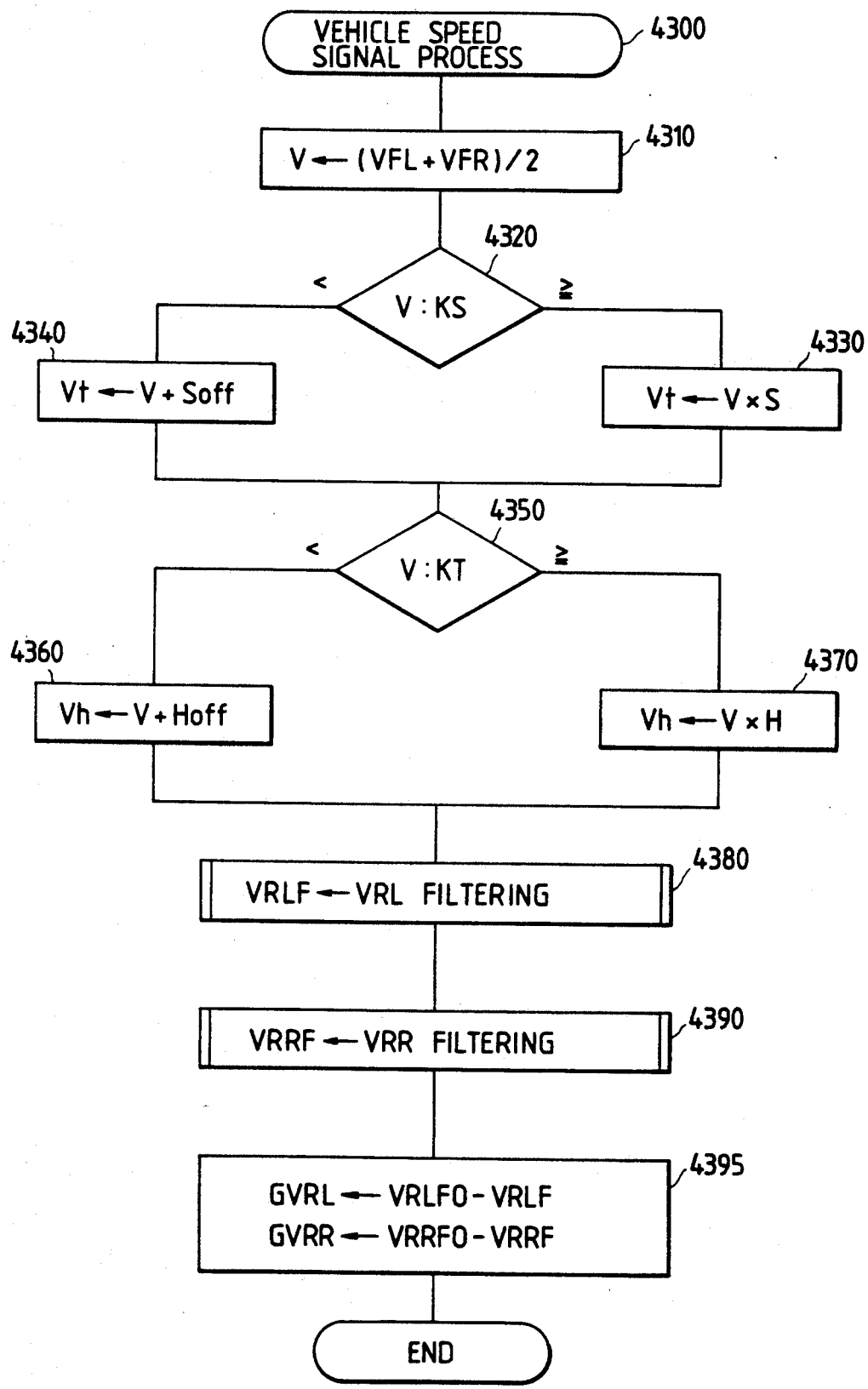
FIG. 5 is a flow chart showing the contents of the step 4300 of the FIG. 3 flow chart.

A signal input base process of the step 4000 will be described hereinbelow with reference to a flow chart of FIG. 3. In a step 4100, inputted are the analog signals indicative of an intake air temperature THA, an acceleration-pedal operating amount AA, an intake pipe pressure PM, a cooling water temperature THW, a throttle opening degree TA and a gear position GP, and in a subsequent step 4200 are inputted the digital signals including an acceleration-pedal full-closing signal IDL, a motor full-closing position signal MOFF and a braking-pedal depression signal BRK. A step 4300 follows to perform a vehicle speed signal process, where, for example, a reference speed necessary for control is calculated on the basis of a front-right wheel speed VFR, a front-left wheel speed VFL, a rear-right wheel speed VRR and a rear-left wheel speed VRL obtained by a vehicle-speed interrupt process synchronous with the wheel speed as illustrated in FIG. 4. In detail, as shown in FIG. 5, a step 4310 is executed to obtain, as a vehicle speed, the average speed of the non-driven wheels, i.e., the front-right wheel VFR and the front-left wheel VFL, followed by a step 4320 to compare the vehicle speed V with a first decision speed KS. If V≧KS, control goes to a step 4330, and if V<KS, control goes to a step 4340. In the step 4330, a target driven wheel speed Vt is obtained as Vt=V×a target slip ratio S, and in the step 4340, it is obtained as Vt=V+a first offset speed Soff. Here, the first decision speed KS is determined so that Soff=KS×S. That is, as shown in FIG. 6, the drive wheel speed is controlled so as to be greater by at least the first offset speed Soff than the vehicle speed V.

After the determination of the target driven wheel speed Vt, a step 4350 is executed to compare the vehicle speed V with a second decision speed KT. If V≧KT, control goes to a step 4370, and if not, control goes to a step 4360. In the step 4370, a traction control start speed Vh is determined as Vh=V×a traction control start slip ratio H, and in the step 4360, it is determined as Vh=V +an offset speed Hoff. Here, the second decision speed KT is set so that Hoff=KT×H.

Figures 6, 10:
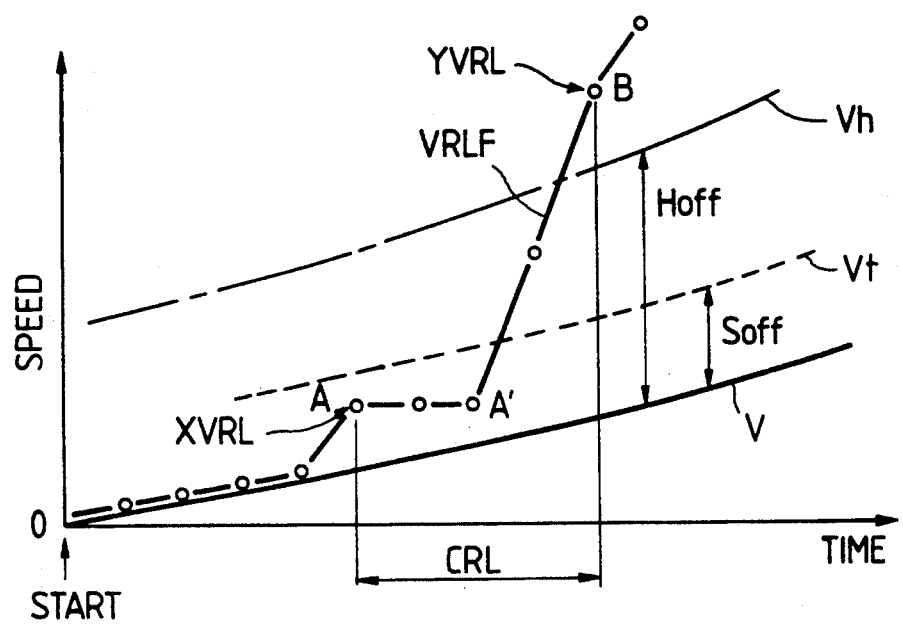
FIG. 6 is a time chart for describing the operation executed in accordance with the FIG. 5 flow chart.
FIG. 10 shows a map to be used in the FIG. 9 process.

Thus, as shown in FIG. 6, when the driven wheel speed becomes greater by at least the second offset speed Hoff than the vehicle speed V, the occurrence of slippage is determined with respect to the drive wheel and the traction control start speed Vh is set so that the traction control which controls the slippage is started. Here, it may be preferable that S=0.1, Soff=2 km/h, KS=20 km/h, H=0.2, Hoff=4 km/h, KT=20 km/h.

The following steps 4380 and 4390 are provided to eliminate vibration due to the friction between the tires and the road surface on the basis of the drive wheel speed signals VRL, VRR. This vibration generally has a period of 30 to 50 ms and should be removed for execution of highly accurate control because it is not a component indicative of a vehicle behavior. In this embodiment, the noise elimination is performed by using a band-eliminating filter for removing only the range of 10 to 30 Hz. Here, it is also appropriate that only on the vehicle start and acceleration all the components of above 10 Hz are removed. The left and right driven wheel signals thus obtained are respectively set to VRLF and VRRF. Finally, control proceeds to a step 4395 in which the left driven wheel acceleration GVRL and right driven wheel acceleration GVRR are respectively obtained by taking the differences between the left driven wheel signal VRLF and the previous value VRLFO thereof and between the right driven wheel signal VRRF and the previous value VRRFO thereof, thereby resulting in termination of the vehicle speed signal process.

Figure 7:
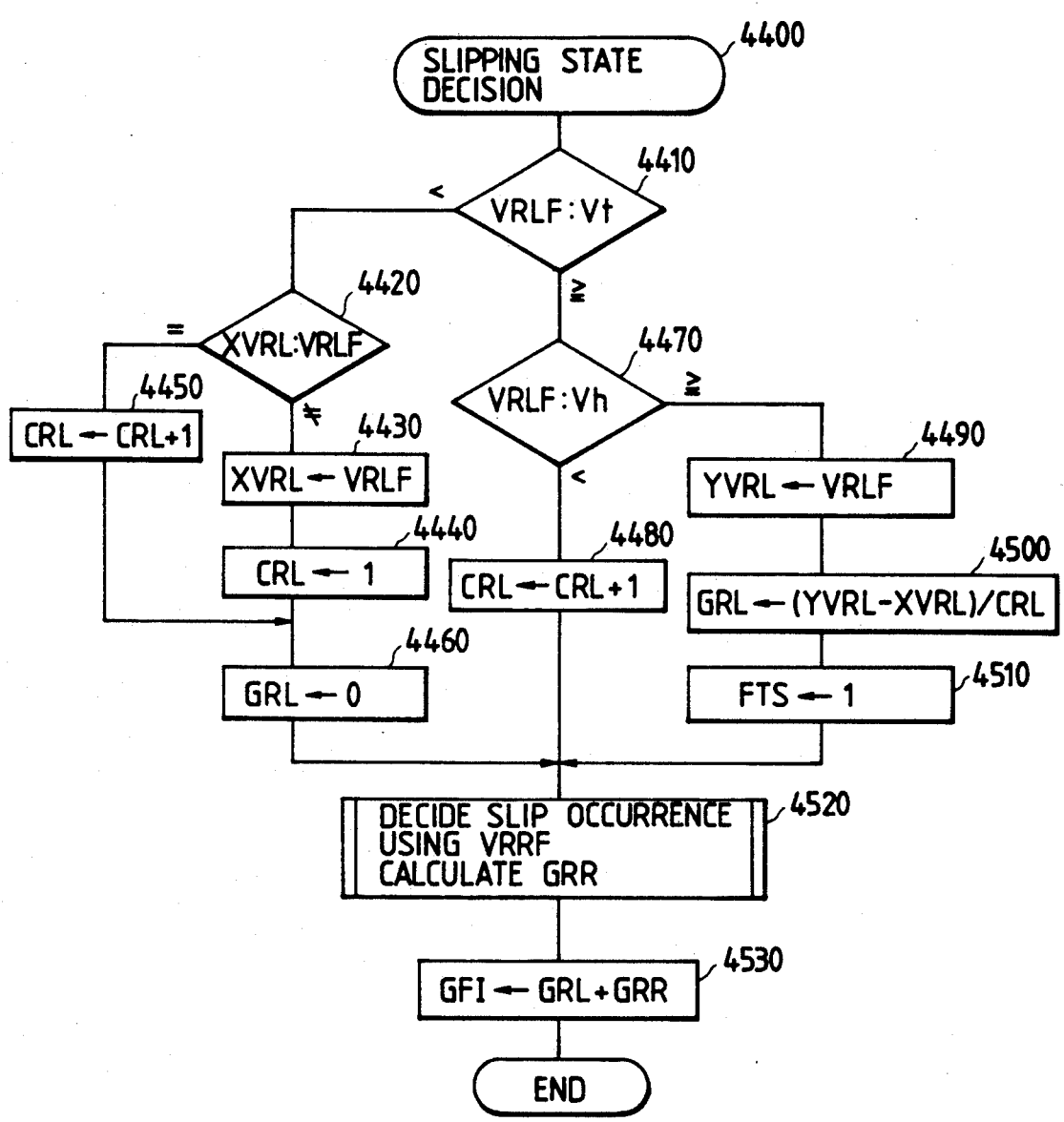
FIG. 7 is a flow chart showing the contents of the step 4400 of the FIG. 3 flow chart.

Returning again to FIG. 3, in a step 4400 is executed a slip state decision process illustrated in FIG. 7. In a step 4410, the speed VRLF of the rear-left wheel (driven wheel) 17 is compared with the traction target speed Vt. If VRLF<Vt, control proceeds to a step 4420 where a rear-left wheel reservation speed XVRL is compared with the rear-left wheel speed VRLF. If the result of the comparison in the step 4420 is that XVRL is equal to VRLF, control goes to a step 4450 so as to increment the value of the counter CRL by one. On the other hand, if the result of the comparison in the step 4420 is that XVRL is not equal to VRLF, control goes to a step 4430 to set the rear-left wheel speed VRLF instead of the rear-left wheel reservation speed XVRL, followed by a step 4440 in which the value of the counter CRL is set to be "1". Thereafter, a step 4460 follows to clear the left driven wheel initial acceleration GRL, followed by a step 4520 for a right driven wheel process.

On the other hand, if the decision in the step 4410 is VRLF≧Vt, control goes to a step 4470 so as to compare VRLF with the traction start decision speed Vh. If VRLF<Vh, a step 4480 follows to increment the value of the counter CRL by one, followed by the step 4520. If VRLF≧Vh in the step 4470, control goes to a step 4490 in order to set the value of the rear-left wheel speed VRLF instead of a left driven wheel final speed YVRL, then followed by a step 4500 to obtain a left driven wheel initial acceleration GRL on the basis of XVRL, YVRL and CRL. Thereafter, in a step 4510, a traction speed condition flag FTS is set to be "1", and the step 4510 is followed by the step 4520. Thus, the occurrence of slippage of the rear-left wheel 17 is decided with the processes of the steps 4410 to 4510 and further the acceleration GRL of the rear-left wheel 17 (left driven wheel initial acceleration) at the time of the decision can be obtained.

The step 4520, with respect to the rear-right wheel 16, executes the same process as the above-mentioned process (steps 4410 to 4510) performed for the rear-left wheel 17 so as to decide the occurrence of slippage of the rear-right wheel 16, and further obtain the acceleration of the rear-right wheel at the decision time, i.e., right driven wheel initial acceleration GRR. Finally, a step 4530 is executed to obtain an initial acceleration GFI on the basis of the left driven wheel initial acceleration GRL and the right driven wheel initial acceleration GRR.

Here, if obtaining the initial acceleration GRL (GRR) when the decision is made as the occurrence of slippage, generally, a process is performed to obtain the difference between the driven wheel speed VRLF (VRRF) at the time of the slippage decision and the drive wheel speed VRLF (VRRF) immediately before the slippage decision. However, when the motor vehicle is running on an irregular road surface and particularly the vehicle speed is low and the slip ratio is small, the driven wheel speed is difficult to be stable and as shown in FIG. 6 the speed does not vary during a time corresponding to several sampling intervals and thereafter the speed can be varied rapidly. Since the initial acceleration value, as described above, is indicative of the magnitude of the frictional coefficient between the running road surface and the wheel tire, in order to accurately obtain the the initial acceleration value, it is required to not only take into account the range from a point A' of the driven wheel speed VRLF to a point B but also the range (from a point A to the point A') in which the speed does not vary. That is, it is required to use the inclination between the point A and the point B. The reason that the driven wheel speed VRLF does not increase between the point A and the point A' irrespective of application of a constant torque is that the torque is once absorbed by the drive system due to deflection of the tire and the drive shaft and then discharged at a stretch in the range from the point A' to the point B.

Further, the reason that, for the calculation of the initial acceleration GFI in the above process, the driven wheel wheel VRLF (which is smaller than the target driven wheel speed Vt) is used as the initial point of the calculation is to obtain the friction state in the vicinity of the target driven wheel speed Vt during the traction control. This is required to accurately obtain the initial acceleration GFI.

Figure 8:
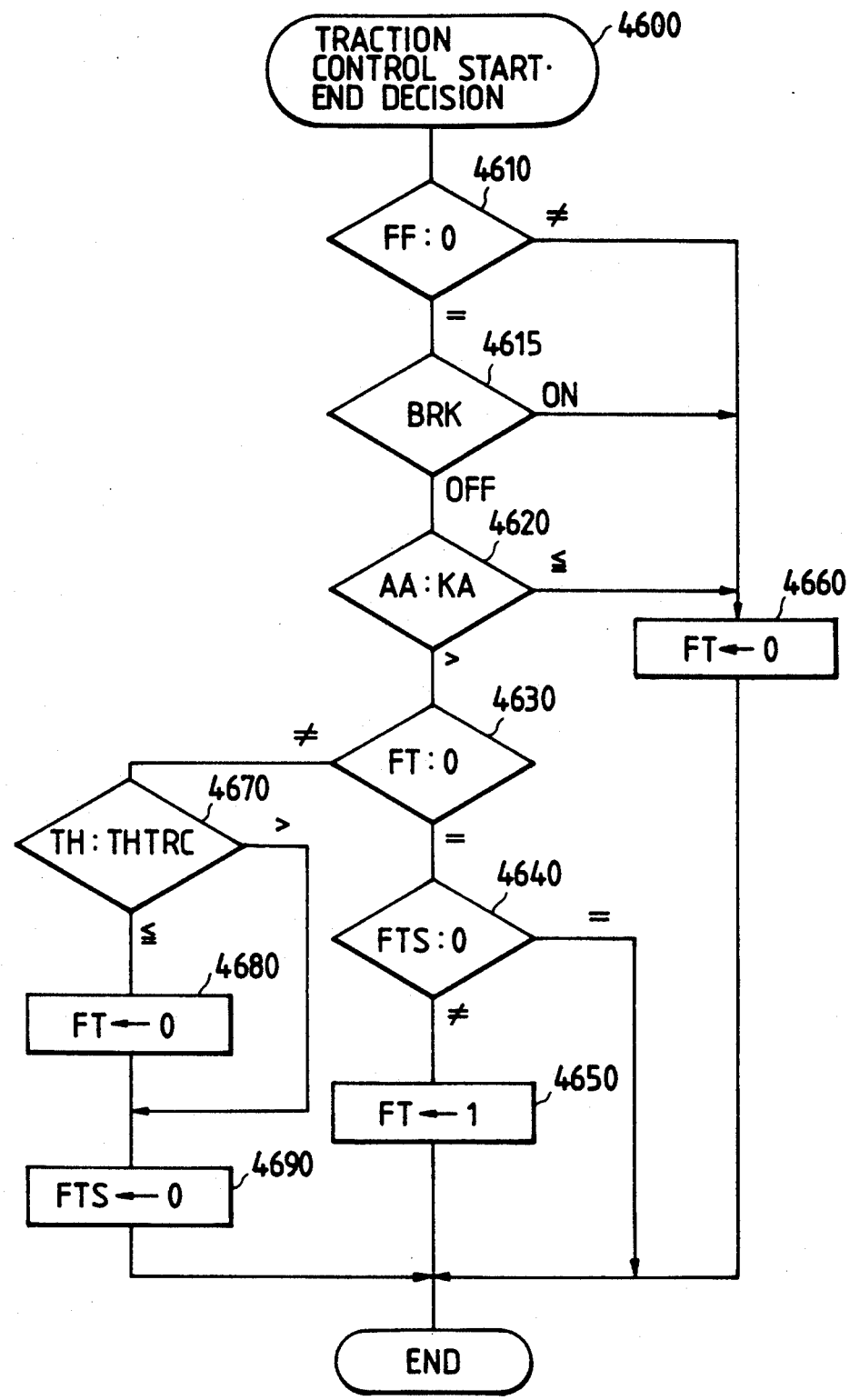
FIG. 8 is a flow chart showing the contents of the step 4600 of the FIG. 3 flow chart.

In the signal input base process step 4000, the slippage state decision step 4400 is followed by a step 4600 in order to decide the start or termination of the traction control as illustrated in detail in FIG. 8. In FIG. 8, in a step 4610 which failure flag FF which is set when the drive system and others of the throttle valve 3 is in the abnormal state whereby, the decision in terms of whether the throttle valve 3 enters into the abnormal state is made in different process. If the flag FF is set, control goes to a step 4660 to reset a traction executing flag Ft, then terminated. If the flag FF is not in the set state, control goes to a step 4615 in order to check whether the signal BRK of the brake sensor 21a is ON. If ON, control similarly proceeds to the step 4660. If OFF, control advances to a step 4620. In the step 4620, the acceleration-pedal operating amount AA is compared with the operating amount decision value KA (in this embodiment, KA=1.5 degrees). If AA≦KA, control goes to the step 4660. On the other hand, If AA>KA, control goes to a step 4630. In the step 4630, it is checked whether the motor vehicle is on the traction control in accordance with the traction executing flag FT. If so, control goes to a step 4670 to compare a target opening degree THTRC on the traction with a target throttle opening degree TH calculated in the throttle control base process step 6000. When TH≦THTRC, control goes to a step 4680 to reset the traction executing flag FT, then followed by a step 4690. On the other hand, if TH>THTRC, control directly goes to the step 4690 so as to reset a traction speed condition flag FTS, thereby causing termination of this process. When in the step 4630 the traction executing flag FT is reset, that is, when the traction is not executed, a step 4640 follows to check whether the traction speed condition flag FTS is set. If so, control goes to a step 4650 to set the traction executing flag FT. If not, this operation is terminated without entering into the step 4650.

With the above-described signal input base process step 4000, data necessary for the traction control are prepared and control using the data is performed in accordance with a program illustrated in FIG. 2.

Figure 9:
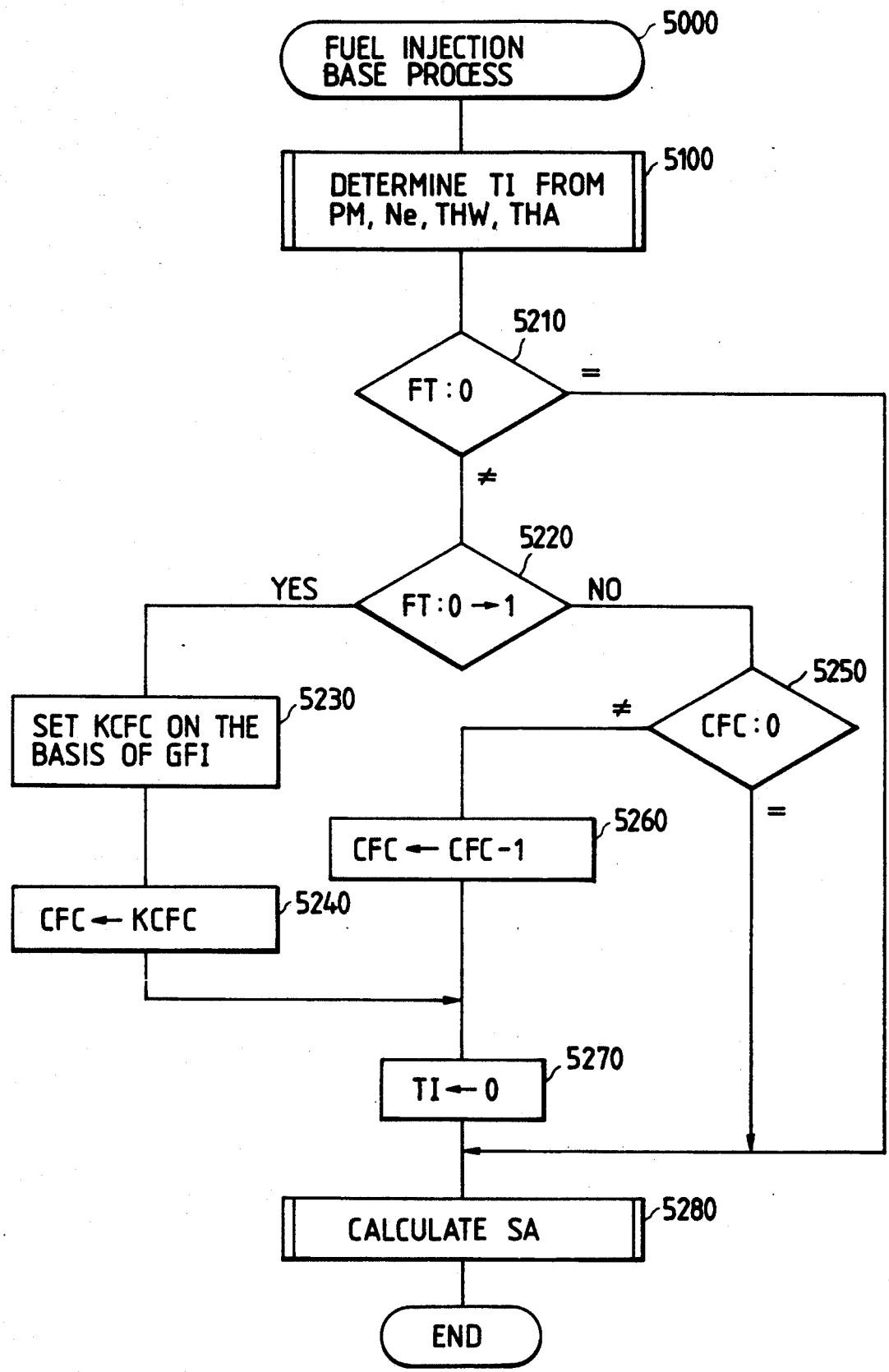
FIG. 9 is a flow chart showing the contents of the step 5000 of the FIG. 2 flow chart.

FIG. 9 shows a fuel injection base process step 5000. In a step 5100, a basic pulse width is determined on the basis of the intake pipe pressure PM and the engine speed Ne and further corrected in accordance with the engine cooling water temperature THW and the intake air temperature THA so as to obtain a fuel injection pulse width TI. A step 5210 follows to check the traction executing flag FT. If it is reset, this operation is terminated. On the other hand, the traction executing flag is in the set state, a step 5220 follows to check whether the traction executing flag FT is set immediately before. If so, control goes to a step 5230 to set a fuel cut time period KCFC in accordance with the initial acceleration GFI of the driven wheel obtained in the slip state decision step 4400 using a predetermined map prestored in the ROM 30d. The cut time period KCFC becomes longer as the initial acceleration GFI is greater, that is, as the frictional coefficient μ is low and hence the friction reaction force from the road surface is smaller. The contents of the map are determined as shown in FIG. 10, for example. Subsequently, a step 5240 is executed to set the cut time period KCFC to a fuel cut counter CFC, followed by a step 5270.

On the other hand, if the answer of the step 5220 is "NO", that is, if the traction control is being performed so as to repress the slippage developed, control goes to a step 5250 to check the value of the fuel cut counter CFC. If CFC =0, control goes to a step 5280. If not, control goes to a step 5260 to decrement the fuel cut counter CFC by one, then followed by a step 5270 to set the fuel injection pulse width TI, determined in the step 5100, to 0. Thereafter, control advances to a step 5280 in which the ignition timing SA is determined on the basis of various input signals.

Figure 11:
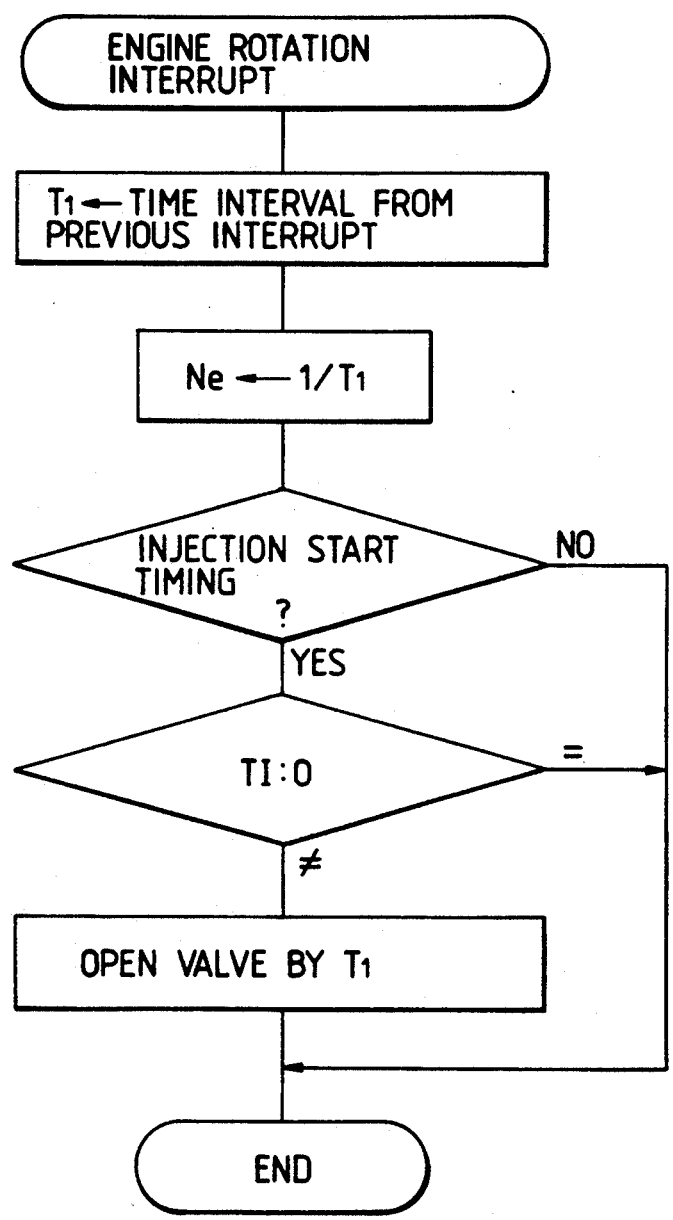
FIG. 11 is a flow chart to be further executed in the ECU in accordance with a predetermined program.

The calculation of the engine speed Ne used in the above-described operation and the opening process of the injection valve 8 follows the fuel injection pulse width TI determined in the above-mentioned operation are performed by the rotation interrupt (occurrence at every crank angle 30°) as illustrated in FIG. 11. Through the steps 5210 to 5250, the fuel injection is stopped for a predetermined time period after the time that the decision is made where the slippage of the driven wheel occurs, the predetermined time period being determined on the basis of the initial acceleration GFI. This is for covering the fact that quick reduction of the engine torque is difficult to be achieved by only the torque reduction due to the throttle valve 3 (which will be described hereinafter) because of response time lag of the intake system immediately after the start of the traction control.

Figure 12:
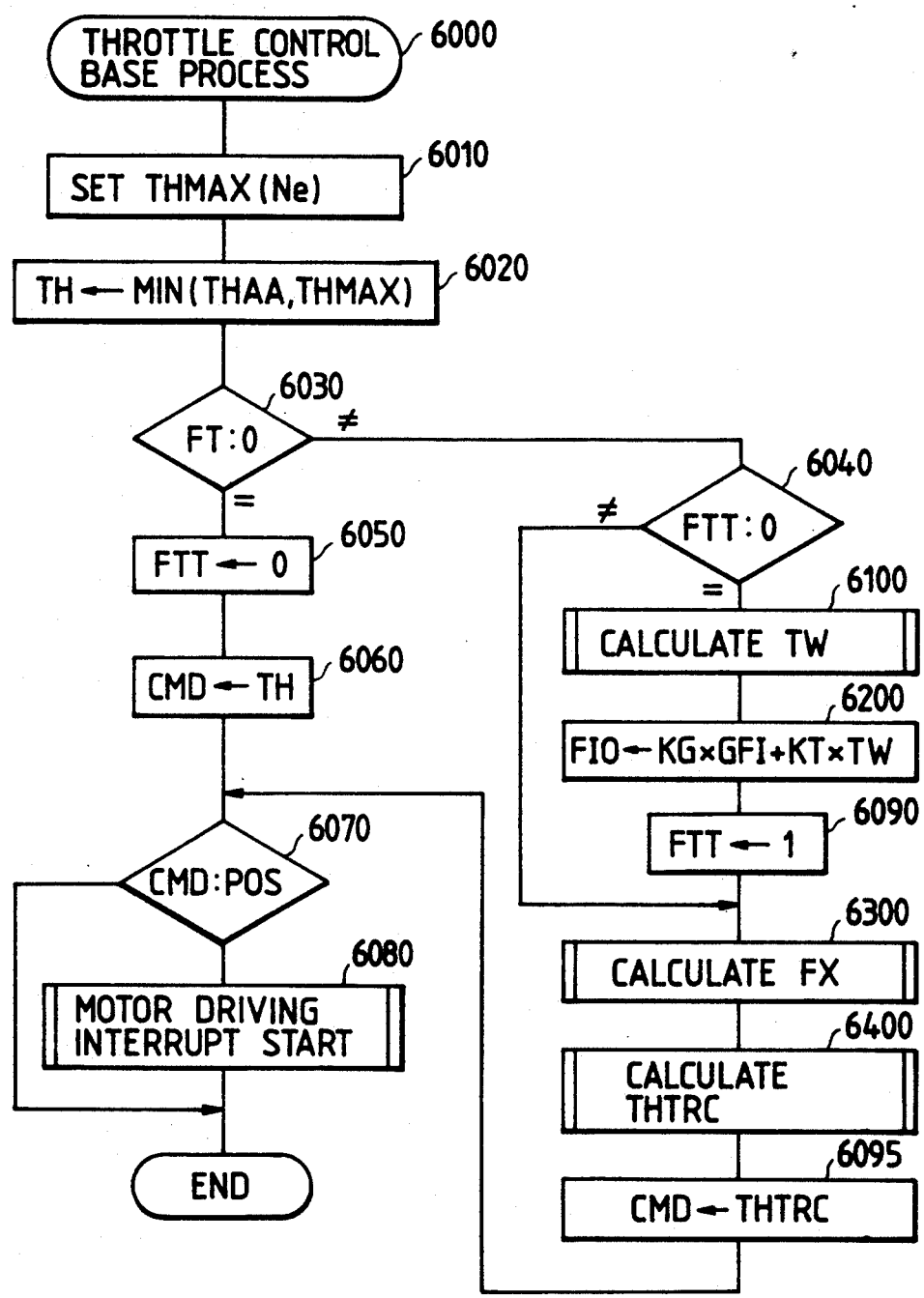
FIG. 12 is a flow chart illustrating the step 6000 of the FIG. 2 flow chart.
Figures 13, 16, 17:
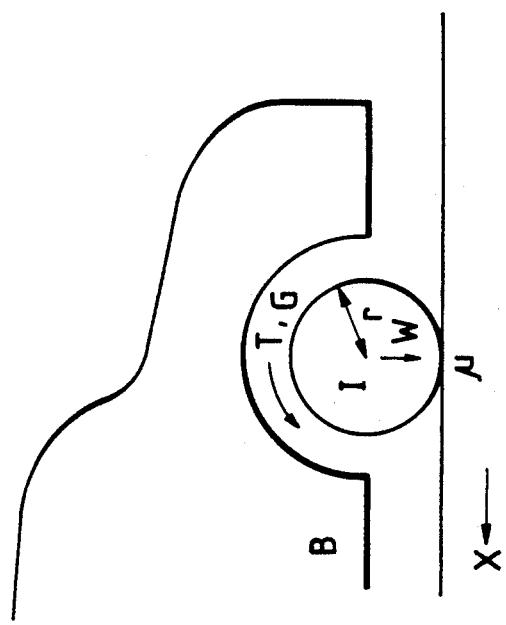
FIG. 13 shows the contents of a map to be used in the FIG. 12 process.
FIG. 16 shows the contents of a map to be used in the FIG. 14 process.
FIG. 17 is an illustration for describing the step 6000 process of the FIG. 12 flow chart.

A throttle control base process step 6000 will be described hereinbelow with reference to FIG. 12. In FIG. 12, a step 6010 is first executed so as to obtain the maximum throttle opening degree THMAX corresponding to the engine speed Ne by the interpolation calculation of a data table, as illustrated in FIG. 13, which is stored in the ROM 30d. This is for ensuring the response of the throttle valve 3 at the time of valve-closing by obtaining the saturation point of the engine torque with respect to the throttle opening degree and inhibiting more opening of the throttle valve 3. In a subsequent step 6020, a smaller one of the maximum throttle opening degree THMAX and an acceleration-pedal correspondance target throttle opening degree THAA is set to the target throttle opening degree TH. A step 6030 follows to check the traction executing flag FT. If the traction executing flag is set, control goes to a step 6040. If the flag is in the reset state, control goes to a step 6050 to reset a traction start flag FTT due to the throttle valve 3 and then goes to a step 6060 to set the target throttle opening degree TH as a stepping motor target step number CMD, then followed by a step 6070. The step 6040 is provided in order to check the traction start flag FTT. If it is in the reset state, the decision is made as the initial process at the time of the traction control due to the throttle valve 3, and a step 6100 follows to calculate the current driven wheel torque TW (at the time of the decision of occurrence of slippage).

Figure 14:
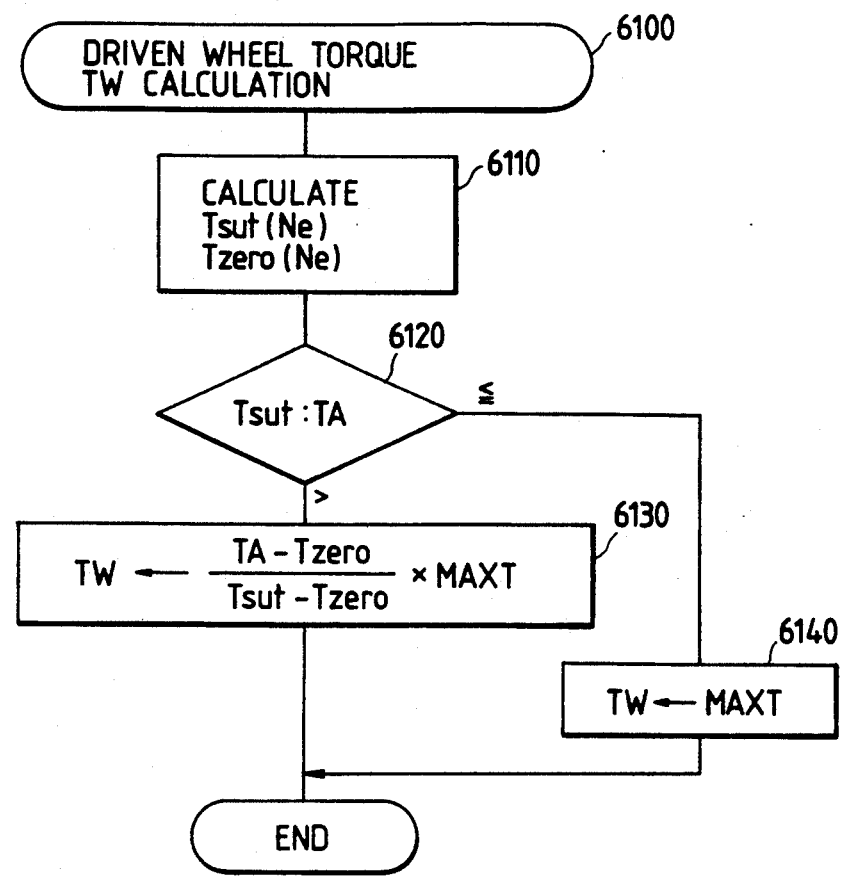
FIG. 14 is a flow chart illustrating the contents of the step 6100 of the FIG. 12 flow chart.

Here, the process of the driven wheel torque TW calculation step 6100 will be illustrated in FIG. 14. In FIG. 14, a step 6110 is initially executed in order to attain a zero torque opening degree Tzero and a torque saturation opening degree Tsut.

Figure 15:
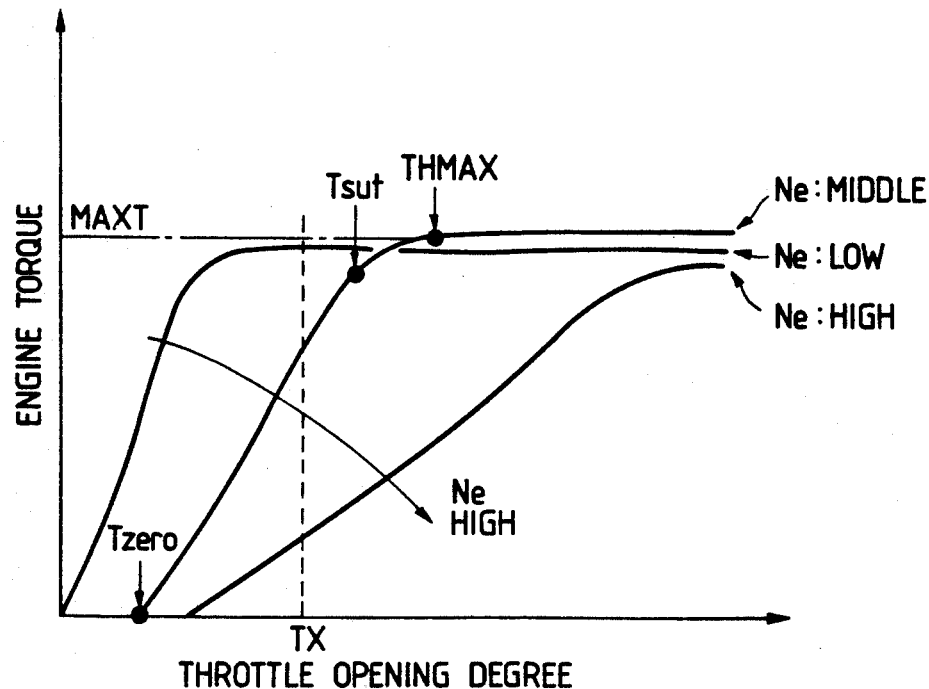
FIG. 15 is a diagram showing the relation between the engine torque and the throttle opening degree in a gasoline engine.

Generally, in a gasoline engine, the relation between the throttle opening degree and the engine torque is as illustrated in FIG. 15. The torque is linearly increased to some degree and saturated at a given point whereby the torque is not increased regardless of increase in the opening degree. Furthermore, in accordance with increase in the engine speed, the inclination of the linear portion becomes smaller and the throttle opening degree by which the torque is saturated becomes greater. Thus, in the step 6100, the present driven wheel torque TW is obtained on the basis of the relation between the throttle opening degree and the engine torque. As will be understood from FIG. 15, the torque saturation opening degree Tsut corresponds to the upper limit of the straight portion of the line showing the relation between the throttle opening degree and the engine torque and is below the aforementioned maximum throttle opening degree THMAX. In addition, the zero torque opening degree Tzero is a throttle opening degree that the engine torque becomes zero. Therefore, in the interval between the zero torque opening degree Tzero and the torque saturation opening degree Tsut, the linearity between the throttle opening degree and the engine torque can be ensured. Accordingly, in this embodiment, through experiments, the zero torque opening degree Tzero and the torque saturation opening degree Tsut are predetermined in advance, and the reaction between the zero torque opening degree Tzero, torque saturation opening degree Tsut and the engine speed Ne determined through the results of the experiments is stored as a map in the ROM 30d. In a step 6110, the torque zero opening degree Tzero and the torque saturation opening degree Tsut are obtained by the interpolation calculation on the basis of the engine speed Ne. One example of this map is illustrated in FIG. 16.

Subsequently, in a step 6120 the relation between the present throttle opening degree TA and the torque saturation opening degree Tsut is checked. If Tsut>TA, a step 6130 follows to calculate the present driven wheel torque TW on the basis of the torque saturation opening degree Tsut, the zero torque opening degree, the present throttle opening degree TA and the engine torque (saturation torque MAXT) at the time of the present throttle opening degree, thereby terminating this operation. On the other hand, If Tsut≦TA, in the step 6120, a step 6140 follows to set the present driven wheel torque TW as the saturation torque MAXT, then followed by the termination of this operation.

Here, The saturation torque MAXT in the aforementioned TW calculation process may be set to be a constant value, and it is also appropriate that the saturation torque is corrected in accordance with factors (air temperature and atmospheric pressure) affecting variation of the air density because the engine torque varies in accordance with the air density.

Returning again to FIG. 12, after the termination of the step 6100, a step 6200 is executed in order to obtain the initial value of an integral control term FI, used for the calculation of a target drive torque FX (which will be described hereinafter), using the present driven wheel torque TW (at the time of the decision of occurrence of slippage) and the driven wheel initial acceleration GFI and set the obtained initial value instead of the previous value FIO of the control term. That is, $$FIOYKG \times GFI + KT \times TW$$

Here, a description will be given hereinbelow in terms of obtaining the initial value of the control term FI by using the driven wheel initial acceleration GFI and the present driven wheel torque TW in the above-mentioned equation.

As shown in FIG. 17, when the driven wheel torque is taken to be T, the moment of inertia of the driven wheel is taken as I, the driven wheel angular acceleration is taken as G, the frictional coefficient is $\mu$, the driven wheel load is W, the driven wheel radius is taken to be r, and the advancing direction is X, taking into account the balance of torques at the circumference of the wheel shaft, $$T = I \times G + \mu \cdot W \cdot r \tag{1}$$

from the equation of motion of the vehicle body, the following result can be obtained.

$$B \cdot \dot{X} = \mu \cdot W \quad (2)$$

Further, at the time immediately after the slippage, the following equation is given from the equation (1).

$$Ta = I \cdot Ga + \mu \cdot W \cdot r$$

Thus, $$\mu = \frac{Ta - I \cdot Ga}{W \cdot r} \quad (3)$$

where Ta represents the driven wheel torque at time of start of slipping and Ga designates the driven wheel acceleration at the time of start of slipping.

Furthermore, since the slip ratio is expressed as $S = (Vd - Vb)/Vd$, when the driven wheel angular velocity is taken as $\omega$, the following equations can be obtained.

$$S = \frac{r \cdot \omega - \dot{X}}{r \cdot \omega}$$

$$\dot{X} = (1 - S) \cdot r \cdot \omega$$
$$\ddot{X} = (1 - S) \cdot r \cdot \dot{\omega}$$
$$= (1 - S) \cdot r \cdot G$$

from the equation (2), $$B \cdot r \cdot G \cdot (1 - S) = \mu \cdot W \quad (4)$$

accordingly, $$G = \frac{\mu \cdot W}{B \cdot r \cdot (1 - S)} \quad (5)$$

Thus, during the execution of the traction control, the driven wheel T to be required is as follows in accordance with the equations (1), (3) and (5).

$$T = \left[ \frac{I}{B \cdot r^2 \cdot (1 - S)} + 1 \right] \cdot Ta - I \cdot$$

$$\left[ \frac{I}{B \cdot r^2 \cdot (1 - S)} + 1 \right] Ga$$

Here, the factors relating to Ta and Ga are respectively constants which are determined in accordance with the motor vehicle, and the aforementioned torque T can be obtained by the determinations of the driven wheel acceleration Ga and the driven wheel torque Ta at the time of a start of slipping. Since this torque T is obtained by taking into consideration the degree of the friction between the road surface and the wheel tire at the time of a start of slippage, in the case of performing the traction control in order to repress the slippage, if the opening degree of the throttle valve 3 is adjusted so as to realize this torque T from the start of the control, the feedback control for a stable and desirable slip ratio is allowed, thereby ensuring an excellent acceleration performance and a stable running performance.

Therefore, in this step 6200, as described above, a target drive torque FX is obtained on the basis of the driven wheel torque TWQ and the driven wheel initial acceleration GFI at the time of the decision of occurrence of slipping. Here, in most of cases that the traction control is required in order to control the slipping, since the torque at the time of a start of slipping is the maximum torque of the engine, the process in which the driven wheel torque to be obtained in the step 6100 is treated as a constant does not provide a great problem in practice, thereby reducing the load in control.

In addition, as will be seen from the equation (3), the frictional coefficient between the running road surface and and driven wheel tire at the time of occurrence of slipping depends on the driven wheel acceleration Ga (i.e., GFI) and the driven wheel torque Ta (i.e., TW) at the time of slipping occurrence (start), and since as described above, the driven wheel torque will reach the maximum value at the time of the occurrence of slipping, the degree of the friction between the road surface and the driven wheel tire at the time of the occurrence of slipping can subtantially be estimated from the driven wheel acceleration Ga in slipping occurrence, i.e., the driven wheel initial acceleration GFI. Further, as will be understood from the equation (3), as the driven wheel acceleration Ga (i.e., the initial acceleration GFI) at the time of the occurrence of slipping becomes greater, the frictional coefficient $\mu$ becomes smaller, whereby it is estimated that the relation between the road surface and the driven wheel tire results in being an easy slipping state.

After the termination of the step 6200, a step 6090 follows to set the traction start flag FTT, then followed by the step 6300. On the other hand, if in the step 6040 the flag FTT has been set, control jumps to the step 6300 without passing through the above-mentioned steps 6100, 6200 and 6090. That is, the steps 6100, 6200 and 6090 are executed only one time immediately after the setting of the traction executing flag FT.

Figure 18:
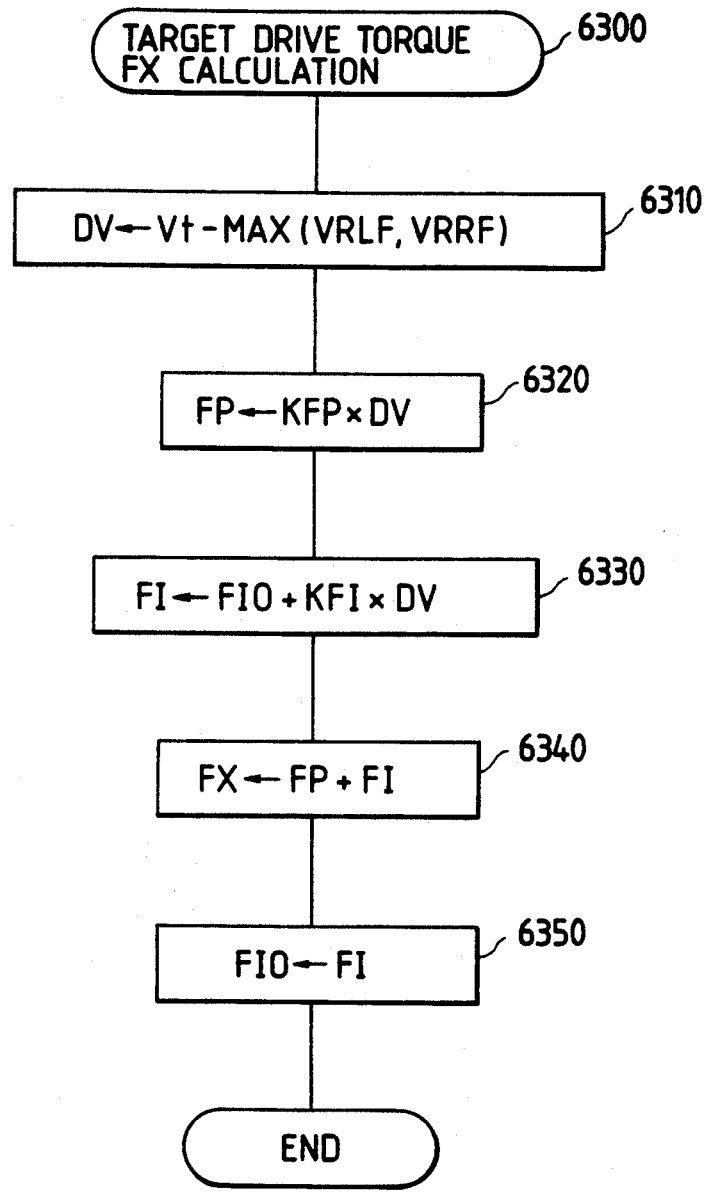
FIG. 18 is a flow chart showing the contents of the step 6300 of the FIG. 12 flow chart.

The step 6300 is provided in order to obtain the target drive torque FX through the proportional integral process (PI process). In detail, as shown in FIG. 18, a step 6310 is first executed so as to obtain the difference between the target driven wheel speed Vt and the greater one of the rear-left wheel speed VRLF and the rear-right wheel speed VRRF obtained in the vehicle speed signal process step 4300 to set it as a driven wheel speed deviation DV. In a subsequent step 6320, the deviation DV is multiplied by a proportional gain KFP in order to attain a proportional control term FP. A step 6330 follows to add the product of an integral gain KFI and the deviation DV to the previous value FIO of the integral control term FI so as to obtain a new integral control terms FI. In a step 6340, the target drive torque FX is calculated from the values FP, FI, finally followed by a step 6350 to set the integral control term FI in the step 6330 as a previous value FIO.

Figure 19:
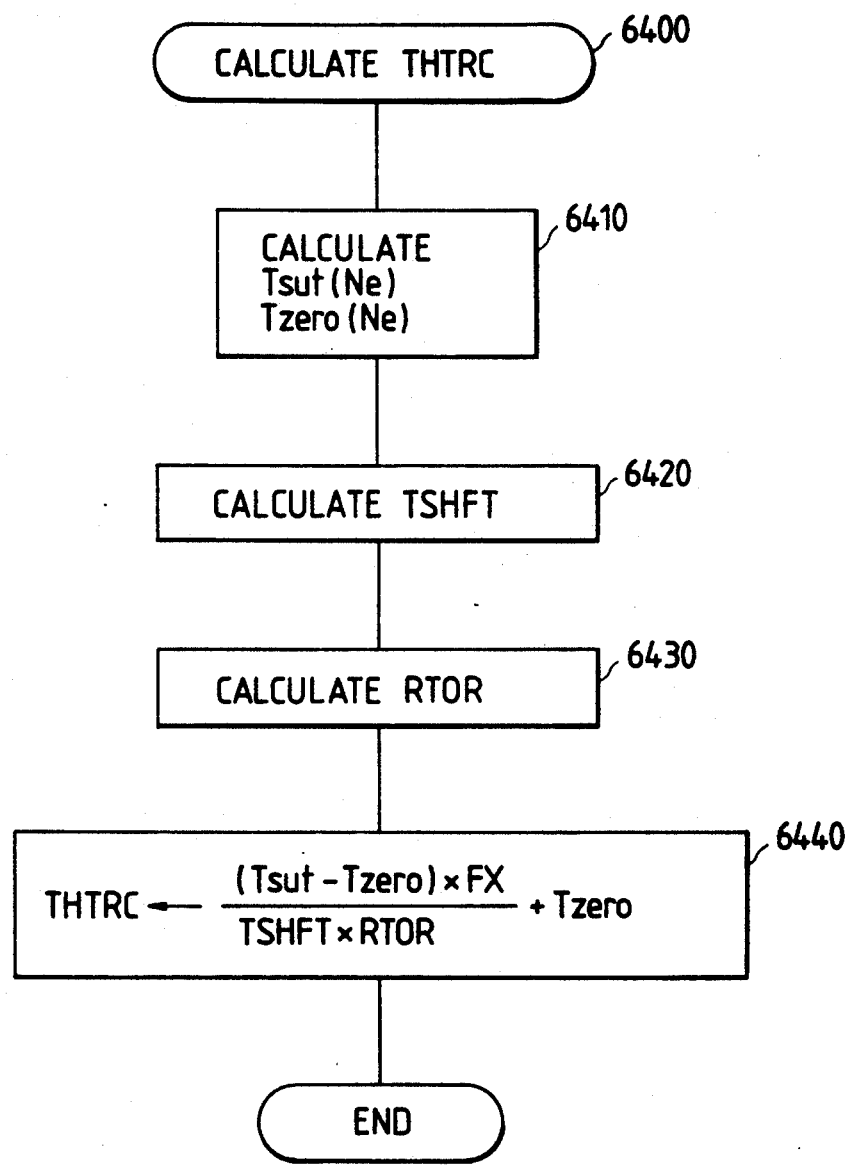
FIG. 19 is a flow chart showing the contents of the step 6400 of the FIG. 12 flow chart.

Futhermore, a step 6400 is executed in order to calculate a traction target opening degree THTRC on the basis of the target drive torque FX attained in the above-described step 6300. This calculation process is effected in accordance with an operation shown in FIG. 19 using the linearity between the engine torque and the throttle opening degree as illustrated in FIG. 15. In FIG. 19, in a step 6410, as well as the step 6110 of the FIG. 14 driven wheel torque TW calculation step 6100, the torque saturation opening degree Tsut and the zero torque opening degree Tzero are obtained on the basis of the engine speed Ne. A step 6420 follows to attain a gear ratio TSHFT on the basis of the gear position GP, followed by a step 6430 to obtain the output speed of the output side of the transmission 14 on the basis of the driven wheel speed (rear-right wheel speed VRRF, rear-left wheel speed VRLF) and the gear ratio of the differential gear 15 and then to obtain a torque transformation rate RTOR of the torque converter 13 as a function of the ratio of the obtained output speed and engine speed Ne. A subsequent step 6440 is then executed so as to perform the first-order transformation of the target drive torque FX in accordance with Tsut and Tzero obtained in the above-mentioned step 6410 and to determine a traction target opening degree THTRC by correcting it with TSHFT and RTOR obtained in the steps 6420 and 6430, thereby terminating this operation.

After the termination of the operation of the step 6400, a step 6095 is executed to set the obtained target opening degree THTRC to a target step number CMD, then followed by a step 6070 to compare the target step number CMD with a real step number POS indicative of the present position of the stepping motor 4 which is used when the stepping motor 4 is driven. If both are different, control goes to a step 6080 to perform a process for start of the motor driving interrupt whereby this operation is terminated. On the other hand, if both are equal to each other, this operation is ended without executing the step 6080.

Figure 20:
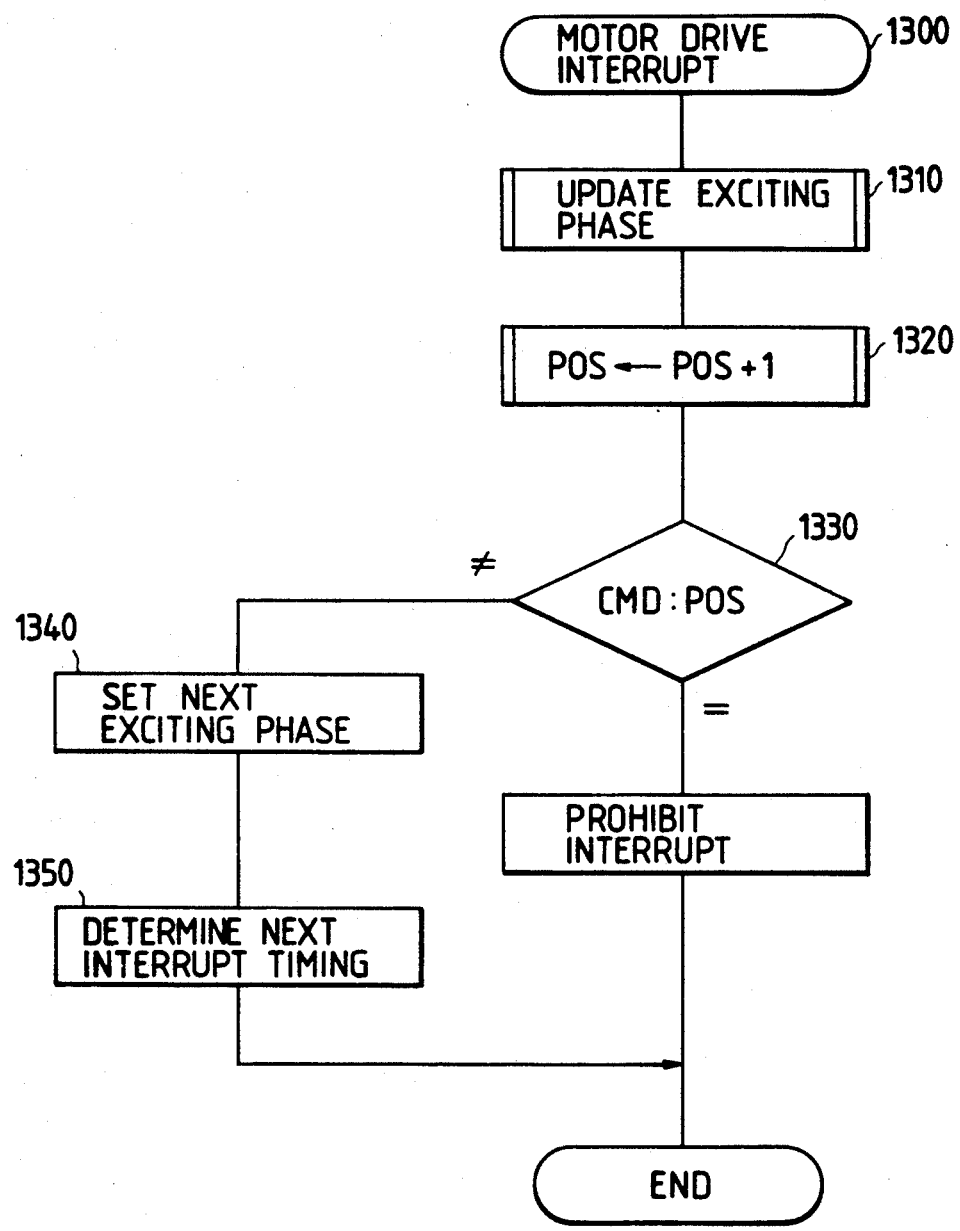
FIG. 20 is a flow chart showing a program to be executed in the ECU.

In the motor driving interrupt, as shown in FIG. 20, a step 1310 is first executed in order to update the exciting phase and a step 1320 is effected to increment the real step number POS by one. A step 1330 follows to compare the target step number CMD with the real step number POS. If both are equal to each other, a step 1330 is executed to perform the interrupt prohibiting process and then to stop the rotation of the stepping motor 4. If both is not equal to each other, steps 1340 and 1350 are respectively effected to set the next exciting phase and interrupt time, thereby terminating this operation.

In this embodiment, when the motor vehicle is running on a rough road surface, the target driven wheel speed Vt is determined from a predetermined value determined as the slip ratio, the required torque FX is set on the basis of the deviation DV with respect to the real driven wheel speed, and the throttle opening degree for realizing this required torque FX is determined at every engine speed using the interval in which ensured is the linearity in the relation between the engine torque and the throttle opening degree (see FIGS. 15 and 16).

Conventionally, since the increase and decrease of the throttle opening degree are directly performed using the driven wheel speed and the non-driven wheel so as to realize a desired slip ratio so that the actual throttle opening degree is controlled to be equal to the target value, when the target driven wheel speed achieving the desirable slip ratio is obtained, the throttle opening degree is fixed accordingly. However, in cases where the motor vehicle is accelerated under the condition that the throttle opening degree is constant, that is, when the engine speed is increased irrespective of the throttle opening degree being constant (TX), since as shown in FIG. 15 the engine torque is lowered in accordance with the increase in the engine speed, the torque which essentially determines the vehicle speed varies in accordance with the acceleration and deceleration. Therefore, in the conventional system, difficulty is encountered to stabilize the control.

On the other hand, in this embodiment, even if the engine speed varies, since the throttle opening degree is arranged to be varied so as to control the torque variation due to the engine speed variation, the control becomes stable without effection by disturbance, thereby resulting in attaining an excellent acceleration performance and a stable running performance.

Figure 21:
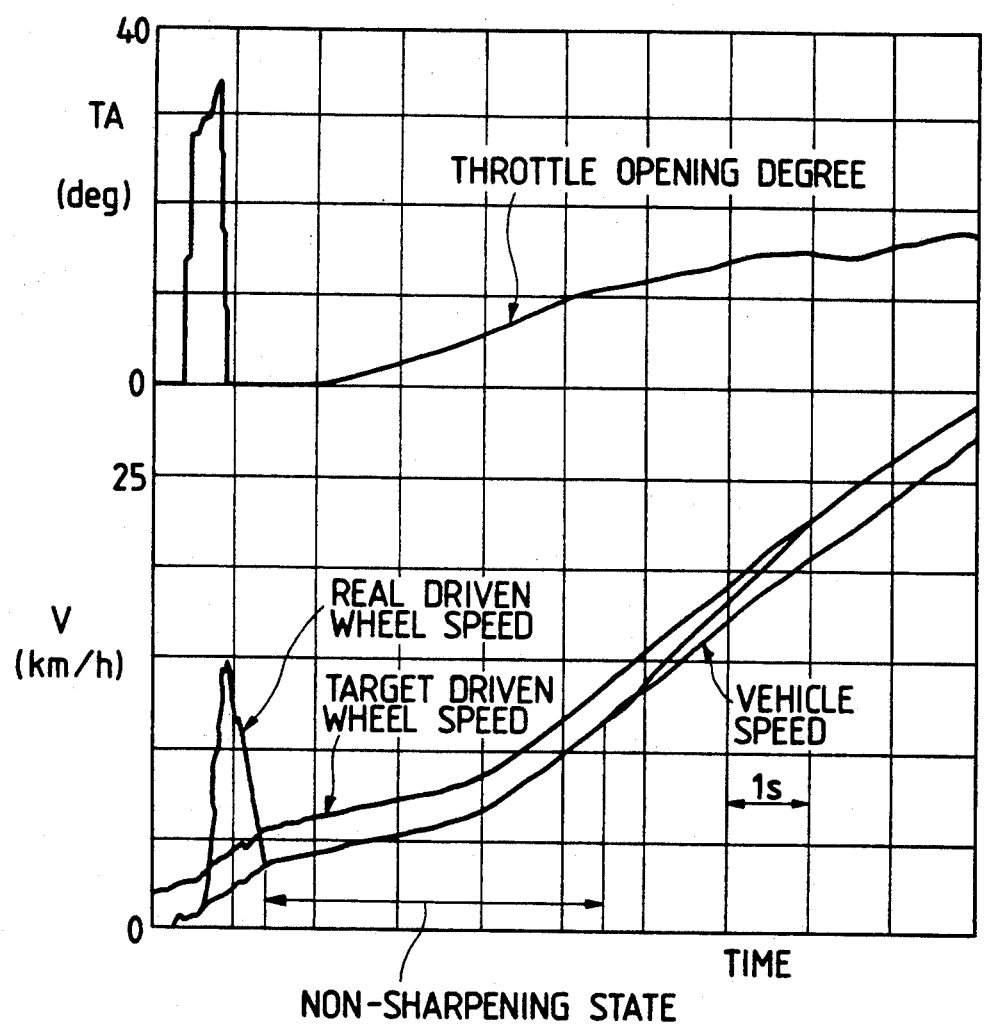
FIGS. 21 to 23 are time charts showing the operating states of conventional systems.
Figure 22:
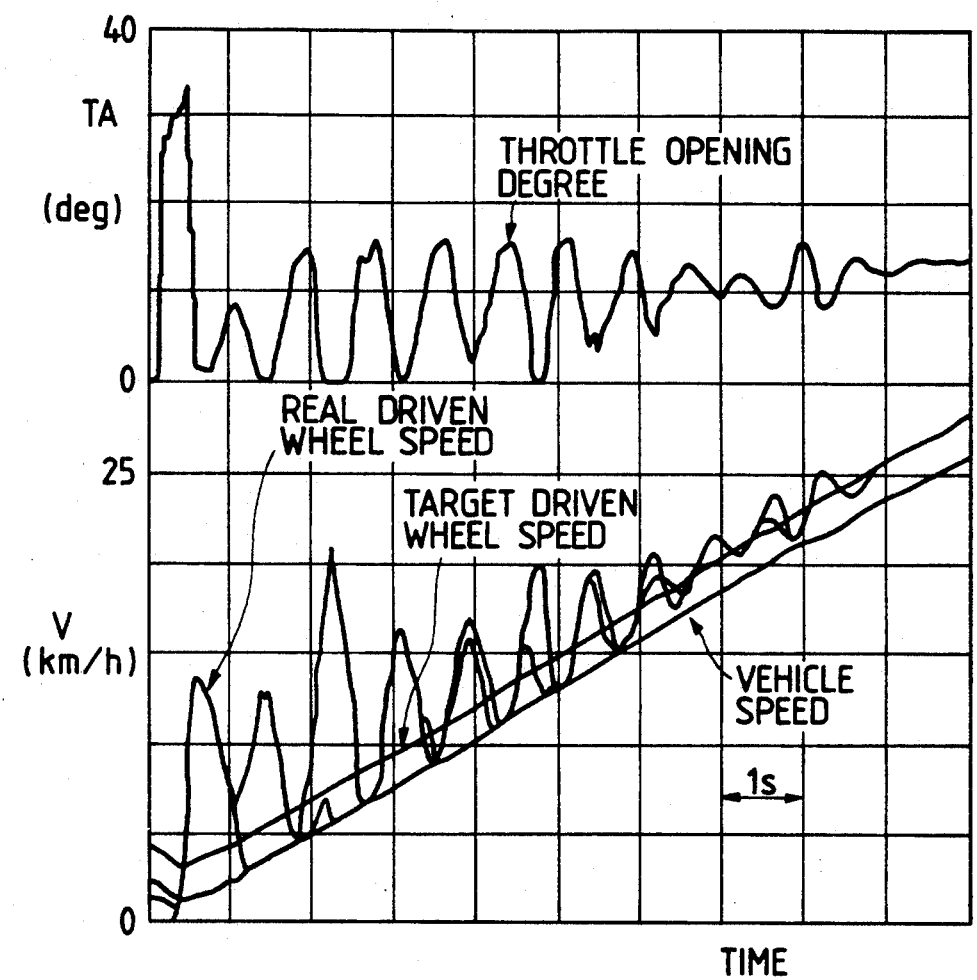
Figure 23:
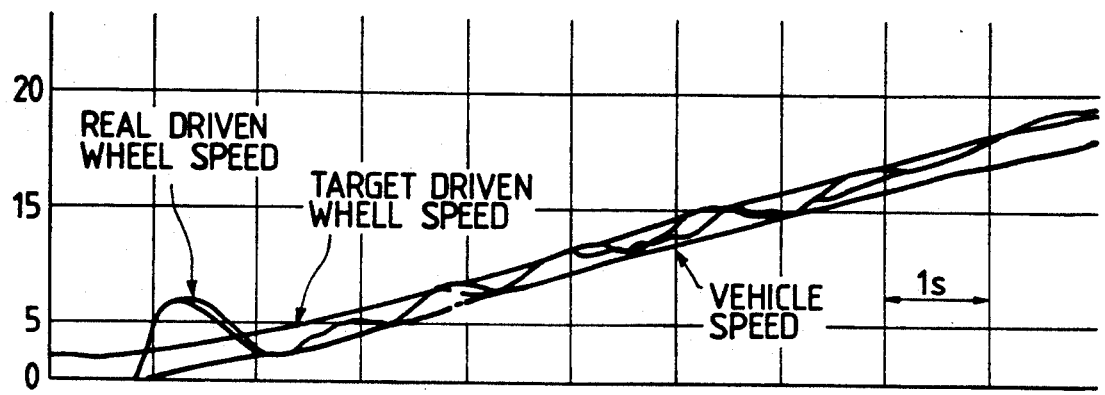

The time chart of FIG. 21 shows a prior art technique for the traction control using the throttle valve 3. In the case that the initial value of the throttle opening degree at the time of a start of the feedback control is zero, since the torque is excessively small, non-sharpening state appears. On the contrary, the time chart of FIG. 22 shows the state that the initial value of the throttle opening degree at the time of a start of the feedback control is set to be excessively great. The throttle opening degree and the real driven wheel speed respectively enter into hunting states so as to cause deterioration of the driving feeling. In addition, the time chart of FIG. 23 shows a conventional system in which the target throttle opening degree is directly set on the basis of the driven wheel speed and non-driven wheel speed. In this instance, the follow-up of the real driven wheel speed with respect to the target driven wheel speed is low and the acceleration performance and running stability are insufficient.

Figure 24:
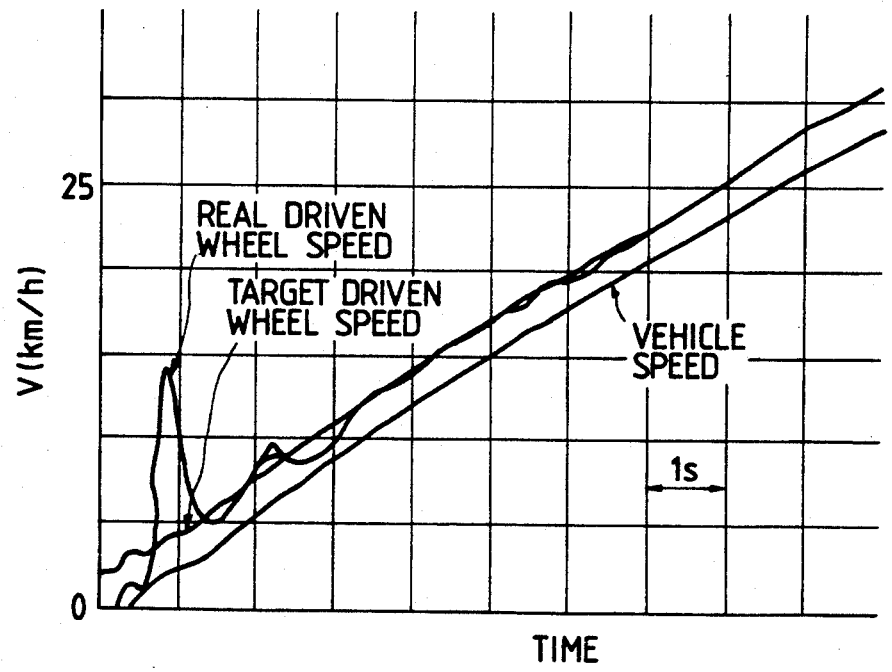
FIG. 24 is a time chart for describing the operation in this embodiment.

On the other hand, in this embodiment in which the throttle valve 3 is basically controlled as described with reference to FIG. 12 and the fuel injection is basically controlled as described with reference to FIG. 9, as shown by a flow chart of FIG. 24, the real driven wheel speed highly follows the target driven wheel speed, and therefore both the more excellent acceleration performance and stable running performance can be ensured as compared with the conventional systems.

Although the above-mentioned embodiment relates to the traction control due to the intake amount adjustment by the throttle valve 3 and the traction control due to the fuel cutting, this is also applicable to braking.

Figure 25:
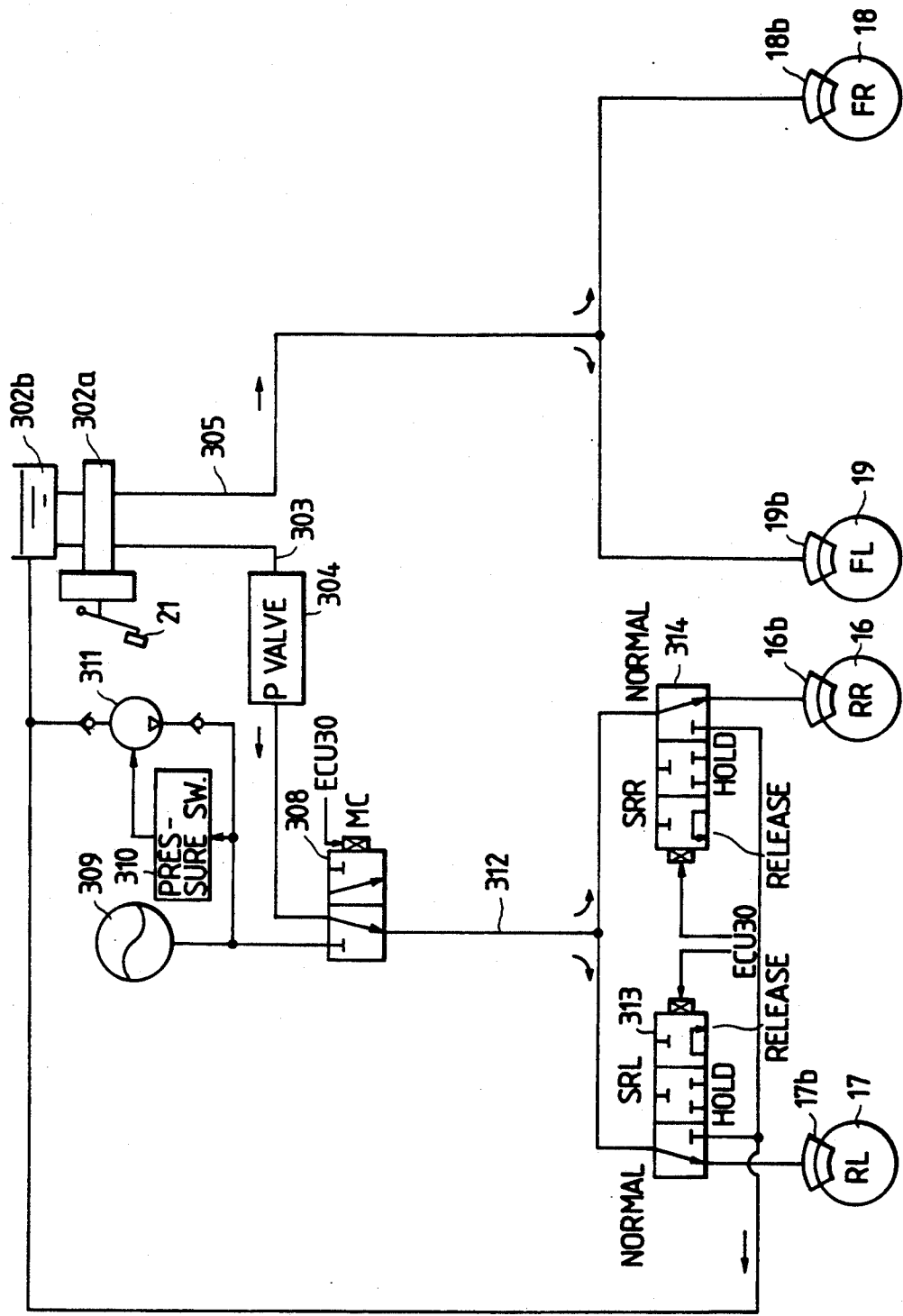
FIG. 25 is an illustration of an arrangement of a second embodiment of the present invention.

FIG. 25 is a piping diagram of a braking system of a motor vehicle. On a braking cylinder 302a subjected to a force through a braking pedal 21 is provided a reservoir tank 302b. The force of the braking pedal 21 is directly applied through a front-wheel hydraulic pipe 305 to braking discs 18b and 19b for the front-right wheel 18 and the front-left wheel 19. On the other hand, a rear-wheel hydraulic pipe 303 transfers it to a master control valve MC 308 after the maximum pressure is limited to about 70 KgW by means of a propertioning valve (P valve). The master control valve Mc 308 transfers the hydraulic pressure to a rear-left wheel control solenoid SRL 313 and a rear-right wheel control solenoid SRR 314 when being at the ordinary position illustrated in FIG. 25. In response to energization to the master control valve MC 308, the passage of the hydraulic pressure is switched so that the pressure of an accumulator 309 is transferred to SRL 313 and SRR 314. The pressure of the accumulator 309 is always kept to 100 Kg/cm$^2$ by means of a pressure switch 310 and a pressure-accumulating pump 311 which forces the braking fluid from the reservoir tank 302b to the accumulator 309. The pressures transferred to SRL 313 and SRR 314 are transferred directly to the braking disc 17b for the rear-left wheel 17 and the braking disc 16b for the rear-right wheel 16 when being at the illustrated position (normal position) taken under the condition of deenergization, while in response to 1A energization of SRL 313 and SRR 314, they are respectively moved by half the entire stroke and all of input and output pipes are closed so as to take the hold mode for maintaining the pressure. On the other hand, in response to 2A energization thereof, they are moved over the entire stroke so as to set the release mode which releases the pressure to the braking discs to the reservoir tank 302b.

Figure 26:
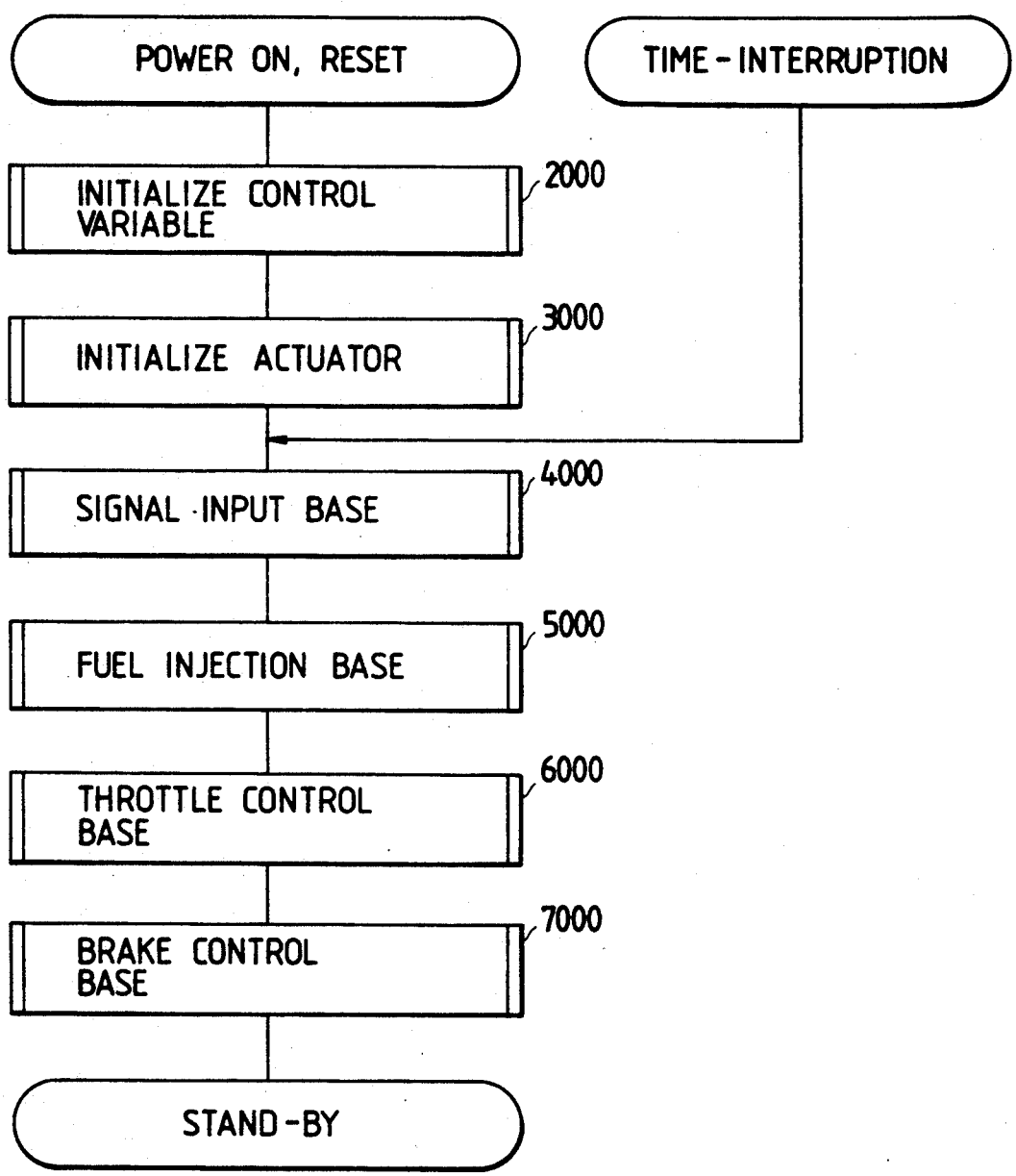
FIG. 26 is a flow chart to be executed in the ECU of the FIG. 25 embodiment.

In this case, the ECU 30 is additionally equipped with an output circuit (not shown) for outputting drive signals to MC 308, SRL 313 and SRR 314. Furthermore, as shown in FIG. 26, in addition to the operation (see FIG. 2) of the ECU 30 in the above-mentioned embodiment, a braking control base step 7000 is added after the throttle control base step 6000, so as to perform the allowance or prohibition of the braking control and calculation of the braking hydraulic pressure.

Figure 27:
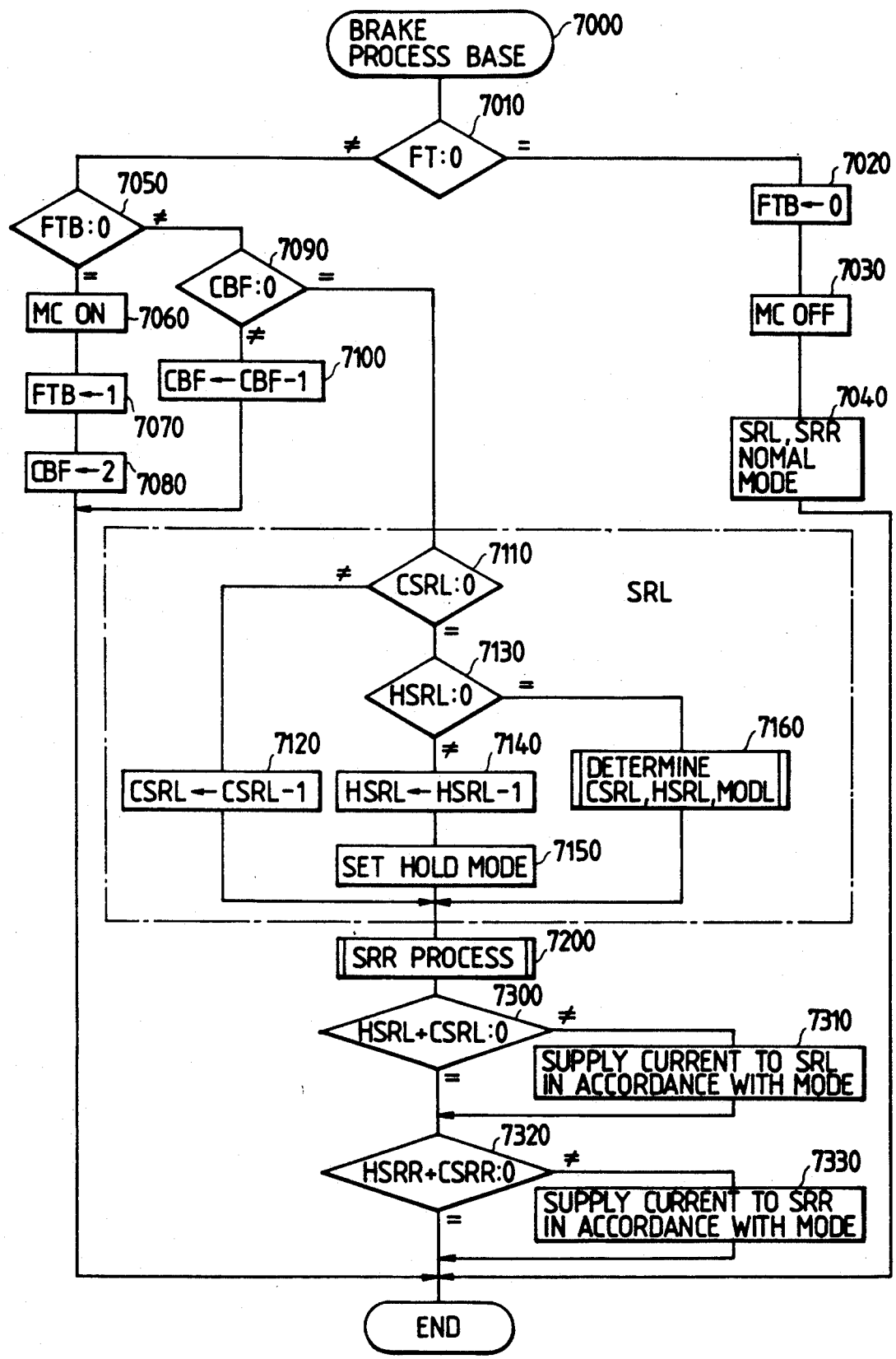
FIG. 27 is a flow chart showing the contents of the step 7000 of the FIG. 26 flow chart.

FIG. 27, in detail, shows the braking control base step 7000. In a step 7010, the traction executing flag FT is checked. If the flag FT is "0" indicating that the traction control is not performed, control goes to a step 7020 to reset an initial process flag FTB, then followed by a step 7030 to turn off the master control valve MC 308 and the pressure source returns to the braking pedal 21 side. Then, this operation is terminated after returning to the normal mode to pressure-increase SRL 313 and SRR 314. If the traction executing flag FT is in the set condition, a step 7050 follows to check the initial process flag FTB. If the initial process flag FTB is in the reset condition, the decision is made where the process is the first time after the determination of occurrence of slipping, then followed by a step 7060. In the step 7060, the master control valve MC is set to ON. At this time, since SRL 313 and SRR 314 are ordinarily in the normal modes, respectively, the braking pressure results in being increased. This is for the purpose of increasing pressure in the hydraulic pressure system up to a predetermined value so as to heighten the control response thereafter. In a step 7070, the initial process flag FTB is set, followed by a step 7080 to set an initial process counter CBF to be 2, thereby terminating this operation. On the other hand, if in the step 7050 the initial process flag FTB is in the set condition, control goes to steps 7090 and 7100 to decrement the counter CBF by one untill the initial process counter CBF becomes zero, thereafter terminating this operation. In this process, the initial pressure rising time is set to be 30 ms. If in the step 7090 the counter CBF is zero, the braking pressure control operation is started. A step 7110 is executed in order to check the value of a SRL active time counter CSRL. If the value thereof is not zero, a step 7120 follows to merely decrement the counter CSRL by one, followed by a step 7200 for the SRR process. If CSRL=0, a step 7130 is executed to check whether a SRL hold counter HSRL is zero. If the counter HSRL is zero indicating termination of the braking pressure process in the previous period, a step 7160 follows to determine the contents of the counter CSRL, counter HSRL and the left-side mode MODL.

Figure 28:
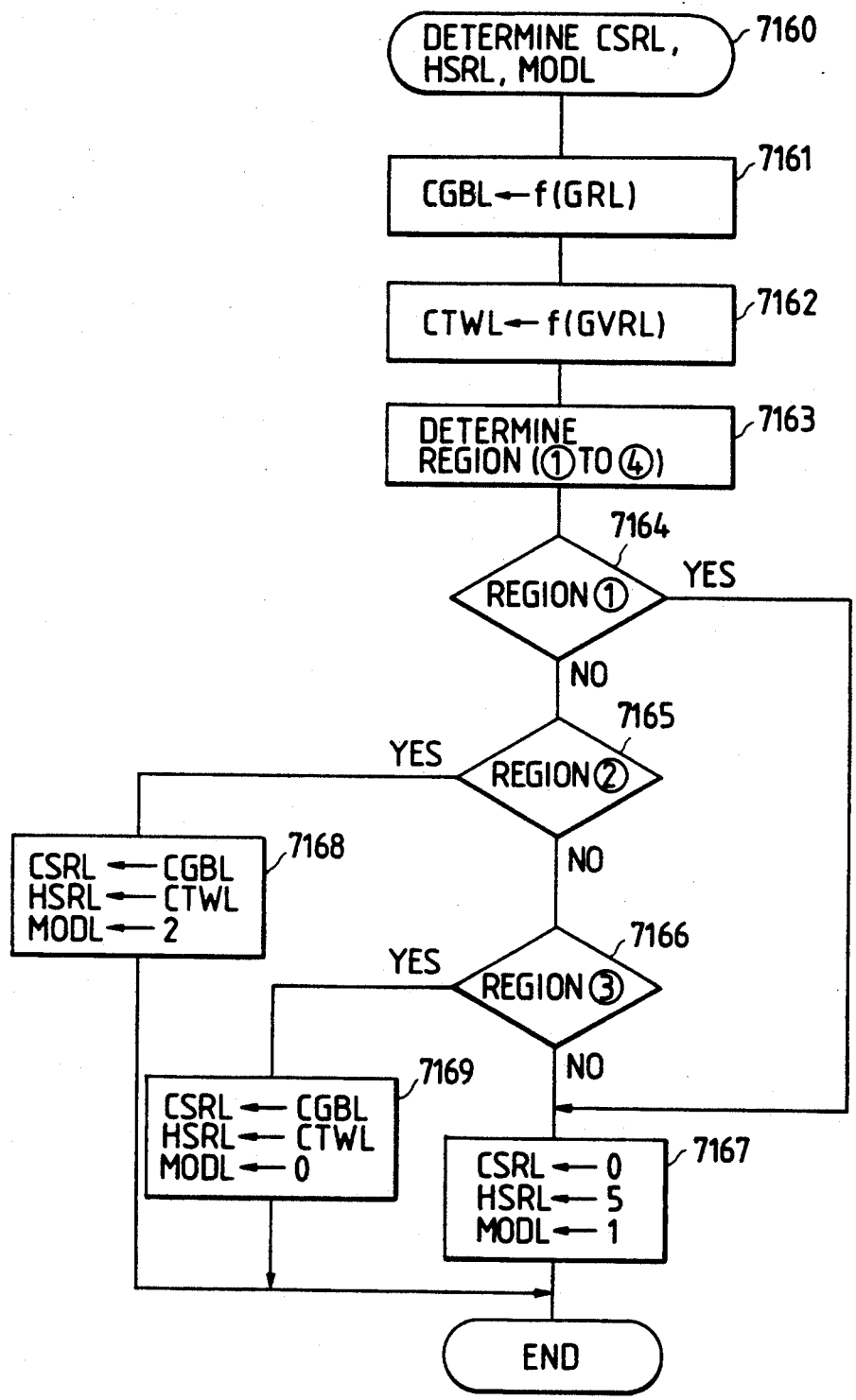
FIG. 28 is a flow chart showing the contents of the step 7160 of the FIG. 27 flow chart.

Here, a detailed description of operation of the step 7160 will be described hereinbelow with reference to FIG. 28. A step 7161 is first executed to determine the value of a left pressure control counter CGBL in accordance with the magnitude of the initial acceleration GRL of the rear-left wheel 17 using a table as illustrated in FIG. 30. Taking into account the fact that the slipping is violent as the initial acceleration GRL is greater, it is preferable that the frictional coefficient is smaller and the control amount is as little as possible in the braking control which absorbs the torque. In a subsequent step 7162, the value of a left pressure maintaining counter CTWL is determined in accordance with the value of the left driven wheel acceleration GVRL (see FIG. 5) using a table as illustrated in FIG. 31. A step 7163 follows to determine one of regions "1" to "4" illustrated in FIG. 29 in accordance with the values of the target driven wheel speed Vt, left driven wheel speed VRLY and left driven wheel acceleration GVRL. A steps 7164 to 7166 follow to determine the values of the counter CSRL, counter HSRL and left mode MODL. In the case of the regions "1" and "4", since the left driven wheel speed VRLF varies to approach the target driven wheel speed Vt, a step 7167 is executed so as to set them as CSRL=0, HSRL=5 and MODL=1 in order to keep the state. In the case of the region "2", since the left driven wheel speed VRLF is lower than the target driven wheel speed Vt and varies so as to be separated from the target driven wheel speed Vt, a step 7168 is executed to set them as CSRL=CGBL, HSRL=CTWL and MODL=2 in order to loosen the braking disc 17b. Further, in the case of the region "3", since the left driven wheel speed VRLF is higher than the target driven wheel speed Vt and is being separated therefrom, a step 7169 is executed to set them as CSRL=CGBL, HSRL=CTWL and MODL=0 in order to tighten the braking disc 17b.

A step 7200 is provided for performing the same process as the steps 7110 to 7160 with respect to the right driven wheel side. Further, a step 7300 is for checking the sum of the counter HSRL and the counter CSRL in the step 7160. If zero, control goes to a step 7320. If not, in a step 7310, the current to SRL 313 is controlled in accordance with the value of MODL, that is, the pressure-increasing is performed when MODL=0, the pressure-maintaining is effected when MODL=1, and the pressure-decreasing is made when MODL=2. The steps 7300 and 7310 are a process for the left driven wheel side (rear-left wheel 17). The steps 7320 and 7330 are for performing the same control as the steps 7300 and 7310 with respect to the right driven wheel side (rear-right wheel 16).

According to the traction control based on braking, as the initial acceleration GRL (GRR) of the driven wheel is greater and further the driven wheel acceleration GVRL (GVRR) is greater, that is, when the frictional coefficient between the road surface and the driven wheel tire is small and the degree of slippage of the driven wheel is great, the braking pressure is frequently adjusted so as to quickly control the slippage up to a desired state. In addition, when the slipping control is being achieved so as to decrease the driven wheel acceleration GVRL (GVRR), the interval for adjusting the braking pressure becomes longer, a desired driven wheel speed can be obtained smoothly. Accordingly, by further using the braking control, more appropriate traction control can be ensured.

In addition, for the slip control may be used ignition timing control. In this instance, although the reduced rate of the torque is about 20%, the response is extremely high. Particularly, in the case that the frictional coefficient is small, the control performance is improved by retardation when quickly repressing that the degree of slipping of the driven wheel becomes great. Thus, in the step 5280 of FIG. 9, the process shown in FIG. 32 is performed.

Figure 32:
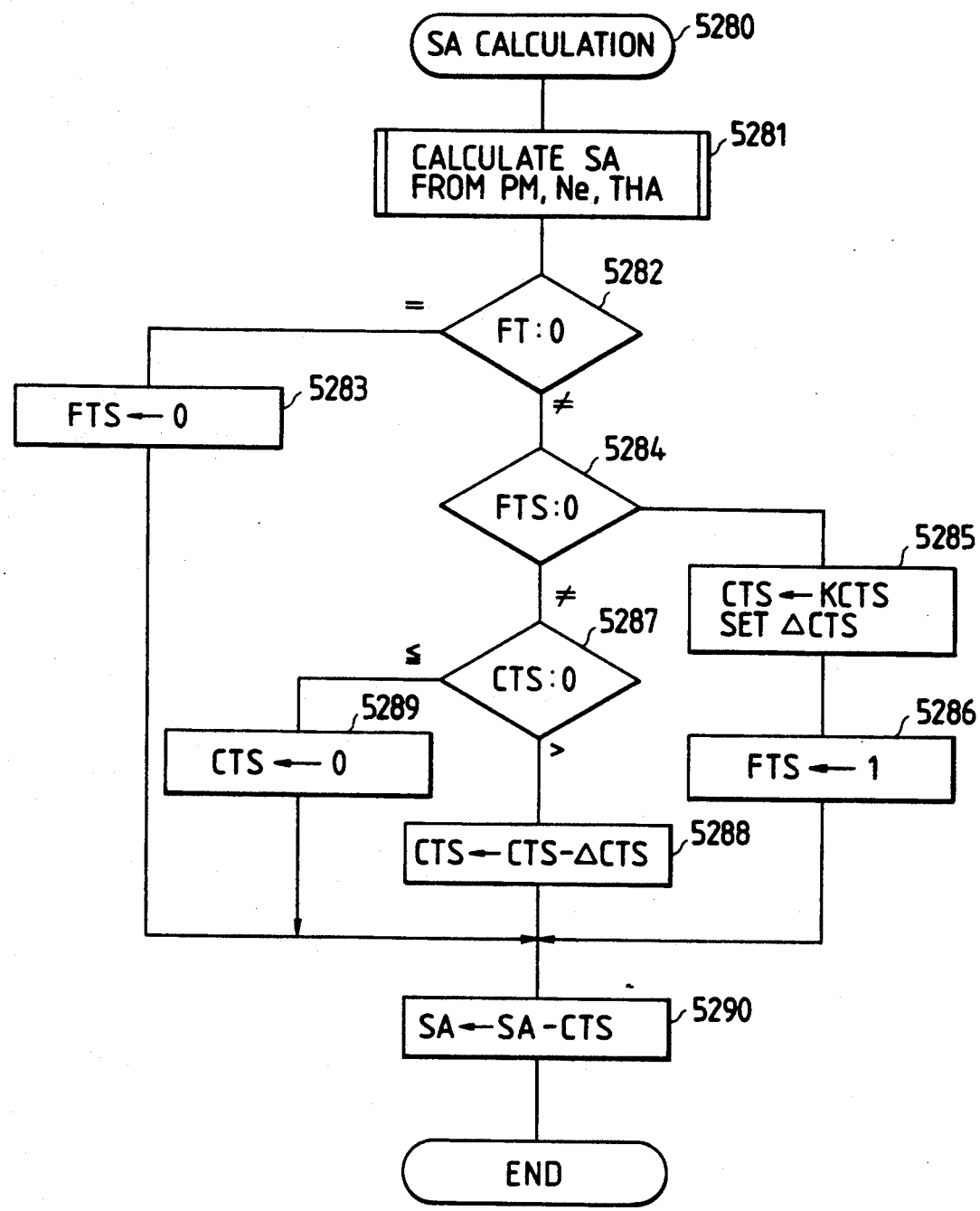
FIG. 32 is a flow chart showing a third embodiment of the present invention.

In FIG. 32, a step 5281 is first executed to obtain an ignition timing advance value SA on the basis of the intake pipe pressure PM, engine speed Ne, intake temperature THA and so on in according with a well known ignition timing calculation method. A step 5282 follows to check the traction executing flag FT. If "0", a step 5283 is executed to reset an ignition initial process flag FTS, then followed by a step 5290. If the flag FT is in the set condition, a step 5284 follows to check the flag FTS. If "0" indicating that the process is the first time, a step 5285 is executed in order to obtain a traction retardation initial value KCTS corresponding to the initial acceleration GFI using a map prestored in the ROM 30d and set it to a traction retardation value CTS and further obtain an attenuation value ΔCTS in accordance with the map prestored therein.

Figures 33, 34:
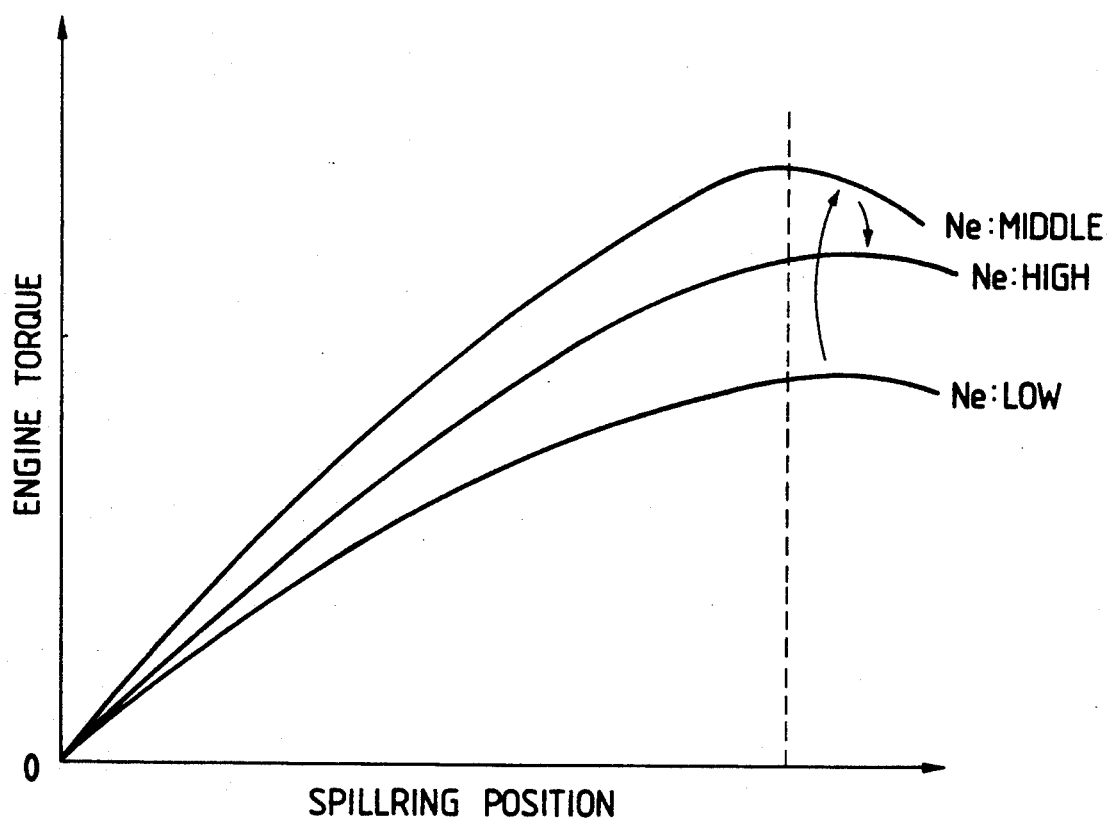
FIG. 33 is a map to be used in the FIG. 32 process.
FIG. 34 is a graphic illustration for describing the relation between the engine torque and spill ring position in a diesel engine.

Here, in the map, the relation between the traction retardation initial value KCTS, attenuation value ΔCTS and the initial acceleration GFI is as illustrated in FIG. 33.

Returning again to FIG. 32, a step 5286 is then performed to set the flag FTS, followed by a step 5290. If the flag has been in the set state, since the process is not the first time, a step 5287 follows to check the traction retardation value CTS whether CTS>0 indicating the execution of the retardation process. If the process is being effected, a step 5288 follows to decrease the retardation value CTS by ΔCTS. On the other hand, if CTS≦0, control goes to a step 5289 to set the retardation value CTS as 0, then followed by a step 5290 to decrease the advance value SA calculated in the step 5281 by the retardation value CTS.

In this operation, in the case that it is estimated that the initial acceleration GFI is great and the frictional coefficient between the road surface and the driven wheel tire is small, particularly, the effect immediately after occurrence of slipping is great by increasing the retardation value, and it is possible to realize appropriate control in accordance with the road surface state. Further, in the above-described process, the attenuation value ΔCTS becomes greater in accordance with increase in the retardation value, and therefore, it is possible to reduce increase in the exhaust temperature and deterioration of the emission due to the retardation.

Here, although the above-mentioned process is effected with the time interrupt, it is also appropriate to use the rotation interrupt independently of the injection base process step 5000.

It should be understood that the foregoing relates to only preferred embodiments of the invention, and that it is intended to cover all changes and modifications of the embodiments of the invention herein used for the purposes of the disclosure, which do not constitute departures from the spirit and scope of the invention. For example, although this embodiment is employed for a gasoline engine motor vehicle, it is also appropriate to be employed for a diesel engine motor vehicle. In the case that the traction control is effected for the diesel engine, as well as the traction control due to the throttle valve 3, the required torque is first determined. In the case of using the VE type pump, the relation between the spill ring position and the engine torque is as illustrated in FIG. 34. Here, the relation varies in accordance with the engine speed Ne and has a upwardly curved characteristic. In order to correct this, in a process corresponding to the step 6100 or 6400 of the throttle control base process, the drive torque at the time of occurrence of slipping is obtained using a two-dimensional map between the spill ring position and the engine speed Ne and further the target spill ring position is obtained in accordance with a two-dimensional map between the required torque and the engine speed Ne, whereby it is possible to perform control with high accuracy as well as the traction control by the throttle valve. Furthermore, in the case of using a line type pump, the control ruck position is similarly controlled.

What is claimed is:

1. A slip control apparatus for use in a motor vehicle, comprising:
   an engine mounted on said motor vehicle for generating a motive power to drive said motor vehicle;
   first detection means for detecting a speed of a driven wheel of said motor vehicle which is driven by the motive power generated by said engine;
   second detection means for detecting a speed of said motor vehicle;
   decision means for determining an occurrence of slipping of said driven wheel on the basis of the detection results of said first and second detection means;
   third detecting means for detecting the degree of materials combustible as a whole int said engine;
   means for quantifying, from the detected speed of the driven wheel, the degree of an acceleration of driven wheel at the time of the determination of occurrence of slipping;
   setting means for setting a target driven-wheel speed on the basis of the vehicle speed of said motor vehicle detected by said second detection means when said decision means determines the occurrence of slipping of said driven wheel;
   target-torque calculation means for calculating a target torque of said engine based on a deviation between the driven-wheel speed detected by said first detection means and the target driven-wheel speed set by said setting means and, on the result of detection by said third detecting means;
   torque adjusting means for adjusting a torque of said engine; and
   control means for controlling said torque adjusting means on the basis of the target-torque of said engine calculated by said target-torque calculation means and the degree of acceleration quantified by said quantifying means.

2. A slip control apparatus as claimed in claim 1, wherein said control means includes;
   feedback control means for performing feedback control of said torque adjusting means so that the driven wheel speed detected by said first detection means becomes equal to the target driven wheel speed which is set by said setting means.

3. A slip control apparatus as claimed in claim 2, wherein said engine comprises a gasoline engine.

4. A slip control apparatus as claimed in claim 3, wherein said torque adjusting means comprises a throttle valve of said motor vehicle for adjusting the amount of air taken into said engine.

5. A slip control apparatus as claimed in claim 4, wherein said feedback control means includes:
   target torque setting means for determining a target value of a torque generated by said gasoline engine in accordance with the difference between said target driven wheel speed and said driven wheel speed;
   target opening degree setting means for setting a target throttle opening degree in correspondence with said target torque; and
   throttle valve operating means for operating said throttle valve so as to take said target throttle opening degree.

6. A slip control apparatus as claimed in claim 1, wherein said engine comprises a gasoline engine.

7. A slip control apparatus as claimed in claim 6, wherein said torque adjusting means comprises a solenoid-operated fuel injection valve, and said control means comprises means for determining a time period for stopping supply of a fuel from said fuel injection valve to said engine on the basis of the target torque calculated by said calculation means and controls said fuel injection valve so as to cut off the fuel supply for the determined time period.

8. A slip control apparatus as claimed in claim 6, wherein said torque adjusting means comprises igniting means for igniting mixture of the air and fuel in said engine, and said control means comprises means for determining a retardation value to retard the ignition timing of said ignition means on the basis of the target torque calculated by said calculation means and means for controlling said igniting means so as to be retarded by a time corresponding to the determined retardation value.

9. A slip control apparatus as claimed in claim 1, wherein said torque adjusting means comprises braking means provided with respect to said driven wheel, and said control means comprises means for controlling a braking force of said braking means in accordance with the target torque calculated by said calculation means.

10. A slip control apparatus as claimed in claim 2, wherein said engine comprises a diesel engine.

11. A slip control apparatus as claimed in claim 2, wherein said engine comprises a diesel engine.

12. A slip control apparatus as claimed in claim 10, wherein said torque adjusting means comprises a spill ring for adjusting the amount of a fuel to be supplied to said engine, and said control means comprises means for controlling a position of said spill ring in accordance with the target torque calculated by said calculation means.

13. A slip control apparatus as claimed in claim 11, wherein said torque adjusting means comprises a spill ring for adjusting the amount of a fuel to be supplied to said engine, and said control means comprises means for controlling a position of said spill ring in accordance with target torque calculated by said calculation means.

14. A slip control apparatus as claimed in claim 10, wherein said torque adjusting means comprises a control ruck for controlling the amount of a fuel to be supplied to said engine.

15. A slip control apparatus as claimed in claim 11, wherein said torque adjusting means comprises a control ruck for controlling the amount of a fuel to be supplied to said engine.

16. A slip control apparatus for a motor vehicle, comprising:
an engine mounted on said motor vehicle;
torque adjusting means for adjusting a torque of said engine;
first detection means for detecting a speed of a driven wheel of said motor vehicle;
second detection means for detecting a speed of said motor vehicle;
decision means for determining occurrence of slipping of said driven wheel on the basis of the detection results of said first and second detection means;
third detecting means for detecting the degree of intake of at least one member in a set of materials combustible as a whole into said engine;
means for quantifying, from the detected speed of the driven wheel, the degree of an acceleration of driven wheel at the time of the determination of occurrence of slipping;
setting means for setting a target driven wheel speed in accordance with the detected vehicle speed when said decision means has determined the occurrence of slipping;
target-torque calculation means for calculating a target torque of said engine based on a deviation between the driven-wheel speed detected by said first detection means and the target driven-wheel speed set by said setting means, on the result of detection by said third detecting means, on the result of detection by said third detection means, and on the degree of acceleration quantified by said quantifying means;
second setting means for setting a target position of said torque adjusting means corresponding to said target torque; and
control means for controlling the position of said torque adjusting means in accordance with said target position.

17. A slip control apparatus as in claim 16, wherein said engine comprises a gasoline engine, and said torque adjusting means comprises a throttle valve.

18. A slip control apparatus as in claim 16, wherein said engine comprises a diesel engine, and said torque adjusting means comprises a spill ring.

19. A slip control apparatus as in claim 16, wherein said engine comprises a diesel engine, and said torque control means comprises a control ruck.

20. A slip control apparatus in a motor vehicle having a driven wheel driven by an engine of said motor vehicle, comprising:
a throttle valve for adjusting a torque of said engine;
driven wheel speed detection means for detecting a speed of said driven wheel;
vehicle speed detection means for detecting a speed of said motor vehicle;
slip decision means for determining occurrence of slipping of said driven wheel on the basis of the detected driven wheel speed and the detected vehicle speed;
driven wheel torque detecting means for detecting a torque of said driven wheel;
means for quantifying, from the detected speed of the driven wheel, the degree of an acceleration of driven wheel at the time of the determination of occurrence of slipping;
engine-condition detection means for detecting the degree of intake of at least one member in a set of materials combustible as a whole into said engine;
setting means for setting a target driven-wheel speed on the basis of the detected vehicle speed;
target torque calculating means for calculating a target torque of said engine on the basis of a deviation between the detected driven wheel speed and the set target driven wheel speed, the detected driven wheel torque, the degree of driven wheel acceleration quantified by said quantifying means, and the result of detection by said engine-condition detection means at the time of the occurrence of slipping of said driven wheel;
throttle opening degree calculating means for calculating a target opening degree of said throttle valve on the basis of said target torque; and
throttle valve operating means for operating said throttle valve to take the calculated opening degree.

21. A slip control apparatus as in claim 20, further comprising
engine speed detection means for detecting an engine speed,
said driven wheel torque detection means including means for calculating the present driven wheel torque in accordance with a driven wheel torque characteristic, which is determined on the basis of the relation between said throttle valve opening degree and said engine speed, and
said throttle opening degree calculating means including means for incorporating information provided by the detected engine speed in said calculation of a target opening degree of said throttle valve in accordance with said driven wheel torque characteristic.

22. A slip control apparatus as in claim 20, wherein said target driven wheel torque calculating means includes:
feedback control means for performing feedback control of the target driven wheel torque so that the driven wheel speed detected by said driven wheel speed detection means becomes equal to a target driven wheel speed which is determined in accordance with the vehicle speed detected by said speed detection means; and
initial value setting means for determining an initial value of said feedback control means in accordance with a slipping state of said driven wheel detected at the time of occurrence of slipping of said driven wheel.

23. A slip control apparatus as claimed in claim 21, wherein said target driven wheel torque calculating means includes:
feedback control means for performing feedback control of the target driven wheel torque so that the driven wheel speed detected by said driven wheel speed detection means becomes equal to a target driven wheel speed which is determined in accordance with the vehicle speed detected by said speed detection means; and
initial value setting means for determining an initial value of said feedback control means in accordance with a slipping state of said driven wheel detected at the time of occurrence of slipping of said driven wheel.

24. A slip control apparatus for use in a motor vehicle comprising:
an engine mounted on said motor vehicle for generating a motive power to drive said motor vehicle;
first detection means for detecting a speed of a driven wheel of said motor vehicle which is driven by said motive power generated by said engine;
second detection means for detecting a speed of said motor vehicle;
decision means for determining an occurrence of slipping of said driven wheel on the basis of the detection results of said first and second detection means;
third detecting means for detecting the degree of intake of at least one member in a set of materials combustible as a whole into said engine;
means for quantifying, from the detected speed of the driven wheel, the degree of acceleration of driven wheel at the time of the determination of occurrence of slipping;
setting means for setting a target driven-wheel speed on the basis of the detected speed of said motor vehicle when said decision means determines the occurrence of slipping of said driven wheel;
target-torque calculating means for calculating a target torque of said engine on the basis of a deviation between the detected driven wheel speed and the set target driven wheel, and on the result of detection by said third detection means, said target-torque calculating means determining the initial value of said target torque on the basis of the acceleration detected by said fourth detection means;
torque adjusting means for adjusting a torque of said engine; and
control means for controlling said torque adjusting means on the basis of the target torque of said engine calculated by said calculation means.

* * * * *

UNITED STATES PATENT AND TRADEMARK OFFICE
CERTIFICATE OF CORRECTION

PATENT NO. : 5,159,990
DATED : November 3, 1992
INVENTOR(S) : Abe et al

It is certified that error appears in the above-indentified patent and that said Letters Patent is hereby corrected as shown below:

On the title page, add item [73] Assignee: "NIPPONDENSO CO., LTD. KARIYA-SHI, JAPAN"

Signed and Sealed this

Nineteenth Day of July, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,159,990
DATED : November 3, 1992
INVENTOR(S) : Abe et al

It is certified that error appears in the above-indentified patent and that said Letters Patent is hereby corrected as shown below:

On the title page, add item [73] Assignee: "NIPPONDENSO CO., LTD. KARIYA-SHI, JAPAN"

Signed and Sealed this

Twentieth Day of September, 1994

Attest:

BRUCE LEHMAN

Attesting Officer Commissioner of Patents and Trademarks